United States Patent
Biro et al.

(10) Patent No.: US 6,835,758 B2
(45) Date of Patent: Dec. 28, 2004

(54) WATER COMPATIBLE ENERGY CURABLE COMPOSITIONS CONTAINING MALEMIDE DERIVATIVES

(75) Inventors: David Anthony Biro, Rockaway, NJ (US); Mikhail Laksin, Scotch Plains, NJ (US); Yoshinobu Sakurai, Sakura (JP); Hisatomo Yonehara, Sakura (JP); Katsuji Takahashi, Sakura (JP)

(73) Assignee: Sun Chemical Corporation, Fort Lee, NJ (US)

(*) Notice: Subject to any disclaimer, the term of this patent is extended or adjusted under 35 U.S.C. 154(b) by 0 days.

(21) Appl. No.: 10/650,140

(22) Filed: Aug. 27, 2003

(65) Prior Publication Data

US 2004/0110859 A1 Jun. 10, 2004

Related U.S. Application Data

(62) Division of application No. 09/831,688, filed on Jul. 23, 2001, now Pat. No. 6,706,777.

(30) Foreign Application Priority Data

Nov. 14, 1998 (WO) .............................. PCT/US98/24300

(51) Int. Cl.⁷ .......................... C08F 2/46; C08F 22/40; C08J 3/28; C08L 67/00
(52) U.S. Cl. .......................... 522/84; 522/86; 522/88; 522/89; 522/90; 522/117; 522/121; 522/137; 525/57; 525/123; 525/256; 525/289; 527/301
(58) Field of Search ............................ 522/84, 86, 88, 522/89, 90, 117, 121, 137; 525/57, 123, 256, 289; 527/301

(56) References Cited

U.S. PATENT DOCUMENTS

| | | |
|---|---|---|
| 3,729,446 A | 4/1973 | Holub et al. |
| 3,920,618 A | 11/1975 | Ichimura et al. |
| 4,066,523 A | 1/1978 | McGinniss |
| 4,079,041 A | 3/1978 | Baumann et al. |
| 4,626,497 A | 12/1986 | Roth et al. |
| 4,675,414 A | 6/1987 | DeFusco et al. ............ 548/521 |
| 5,034,279 A | 7/1991 | Wilson, Jr. et al. ......... 428/457 |
| 5,446,073 A | 8/1995 | Jonsson et al. ............. 522/104 |
| 6,410,611 B1 * | 6/2002 | Sakurai et al. ............. 522/103 |

FOREIGN PATENT DOCUMENTS

| | | |
|---|---|---|
| EP | 0349645 A1 | 1/1930 |
| EP | 0 618 237 A1 | 10/1994 |
| EP | 1 106 659 A1 | 6/2001 |
| JP | 50123138 | 6/1975 |
| JP | 58-089609 | 5/1983 |
| JP | SHO61-250064 | 11/1986 |
| JP | SHO-62-84813 | 4/1987 |
| JP | 62-079243 | 4/1987 |
| JP | H3-12414 | 1/1991 |
| JP | 5147940 | 6/1993 |
| WO | WO 98/07759 | 2/1998 |

OTHER PUBLICATIONS

Hoyle, Charles: Jonsson, Sonny; Shimose, Makoto; Owens, Jim: Sundell, Per–Erik; Photoinitiator Free Polymerization of Maleimides and Vinyl Ethers; Photopolymerization, American Chemical Society 1997, Chapter 11, pp. 133–149.

Clark, S.C.: Jonsson. S. and Hoyle. C.E.; Photoinitiated Polymerization of Acrylates Using Functional Malemides, Polymer Preprints, vol. 37, 1996, pp. 348–349.

Photopolymerization of Malemide and its N–Substituted Derivatives, Polymer Letters, vol. 6, 1968, pp. 883–888.

Lee, Cherylyn and Hall, H.K., Jr., Photocopolymerizations of Electron–Rich Olefins with Electron–Poor Olefins by Irradiation of their EDA Complexes, Macromolecules, vol. 22, No. 1, 1989, pp. 21–25.

Jonsson, Sonny; Sundell, Per–Erik; Shimose, Makoto; Owens, Him and Hoyle, Charles, Photoinduced Polymerization from Direct Photolysis of Donor Acceptor Complexes, Polymer Material Science and Engineering, vol. 72, 1995, pp. 470–472.

Proceeding of Radtech Europe 1995, pp. 34–56.

* cited by examiner

Primary Examiner—Nathan M. Nutter
(74) Attorney, Agent, or Firm—Sidney Persley

(57) ABSTRACT

A method for curing an active single phase water compatible actinic radiation curable composition, comprising: irradiating a water compatible non emulsion, non dispersing compound, water, and a maleimide derivative.

6 Claims, 2 Drawing Sheets

WATER COMPATIBLE ENERGY CURABLE COMPOSITIONS CONTAINING MALEMIDE DERIVATIVES

Figure 1:
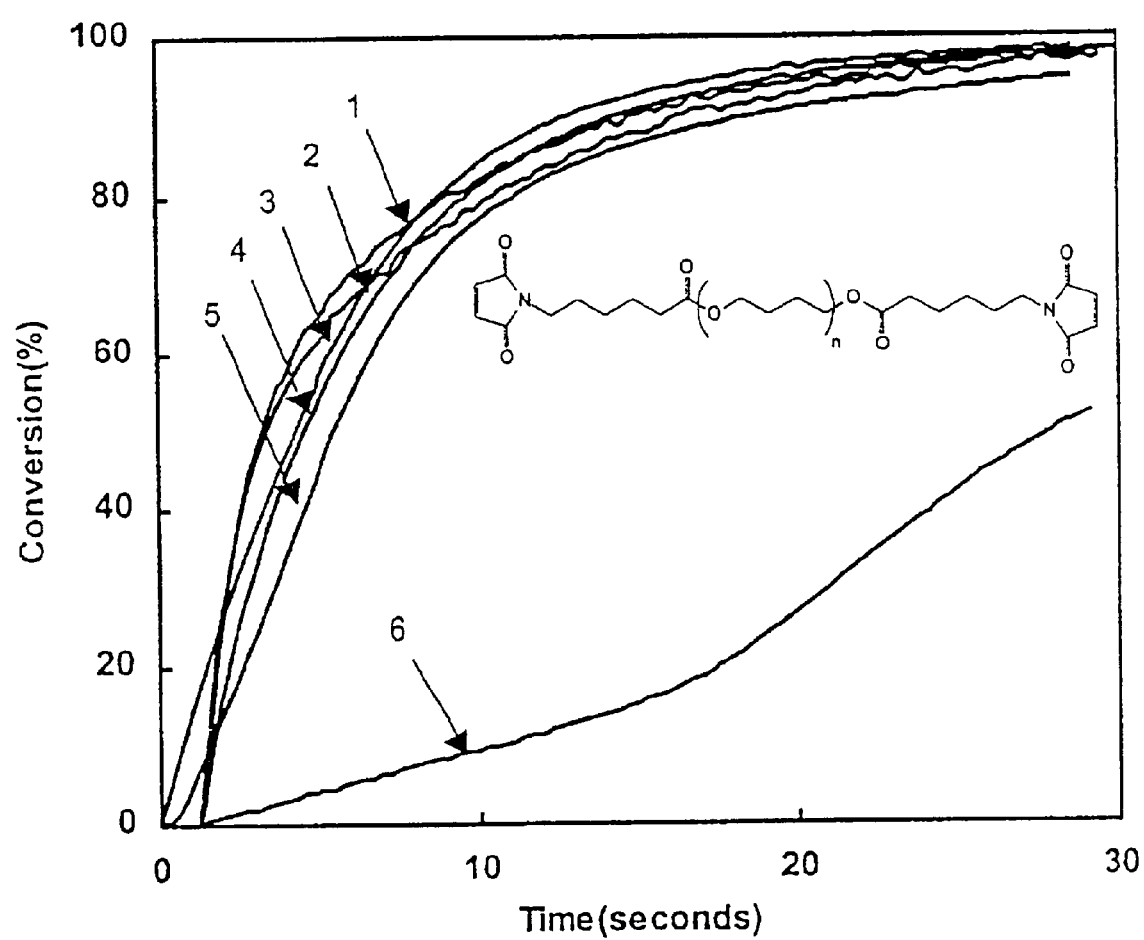

This application is a Divisional of U.S. patent application Ser. No. 09/831,688 filed on Jul. 23, 2001, entitled "Water Compatible Energy Curable Compositions Containing Maleimide Derivatives", now U.S. Pat. No. 6,706,777.

BACKGROUND OF INVENTION

1. Field of the Invention

The present invention relates to active water compatible energy curable compositions containing a maleimide derivative, useful for preparing various coatings, printing inks, surface finishes, moldings, laminated plates, adhesives, and binders. More specifically, the present invention relates to active water compatible energy curable compositions, which can be cured in the absence of a photoinitiator with an irradiation source of practical intensity and energy value.

2. Description of Related Art

An active energy curable composition polymerized under irradiation of active energy such as thermal energy, ultraviolet light, visible light, and the like, has an advantage of being rapidly cured. Active energy curable compositions are widely used as paints, inks, adhesives, coatings, and the like. However, conventional ultraviolet active energy curable compositions cannot initiate polymerization alone upon irradiation with an energy source; it is therefore necessary to use a photoinitiator. When photoinitiators are used in large quantities, curing progresses rapidly, which encourages the use of large quantities of photoinitiator.

Photoinitator compounds having an aromatic ring are used in general because they effectively absorb ultraviolet light. However, these compounds cause problems such as the yellowing of the cured materials upon addition of heater light. Moreover, low molecular weight energy curable monomers and oligomers, commonly used as photoinitiators because of their solubility a property necessary to initiate photopolymerization effectively, unfortunately have high vapor pressures. Therefore, they tend to give off unpleasant odors at temperatures ranging from room temperature to 150° C. Because infrared light, for example, is generated from an ultraviolet energy source, active energy curable compositions are heated substantially upon contact with such light sources. The heating problem is magnified when the ultraviolet light lamps are arranged and used in a side-by-side fashion. The unpleasant odors given off from the photoinitiator result in an unhealthy working environment.

Unreacted or decomposed photoinitiators remain behind in conventional energy curable compositions even after exposure to irradiation by the active energy cure source. These unreacted or decomposed photoinitiators cause problems such as changing the color of the cured film to yellow, unpleasant odors, and the like, when the cured film is exposed to heat or light. For example, when a material at high temperature, such as a thermal head, contacts an active energy curable composition comprising photoinitiator, strong unpleasant odors are given off. Finally, when these cured compositions are contacted by water after irradiation; unreacted photoinitiator is exuded; therefore causing the active energy curable composition to be unsuitable for food packaging applications.

In solving some of these problems, the prior art presents many options. For instance, JP-A-58-89609 discloses an energy curable resin comprising a polymer with polymerizable unsaturated acrylic group and an organic solvent-soluble styrene containing an acrylic thermoplastic resin that does not need a photoinitiator.

WO 89/05827 teaches photopolymerizable adhesive compositions comprising a copolymer of methacrylate monomer and/or methyl acrylate and a photopolymerizable monomer. These photocurable compositions, however, cannot be sufficiently cross-linked by practical irradiation energy sources.

U.S. Pat. No. 5,446,073 and *Polymer Preprints*, Vol. 37, No. 2, pp. 348–49, 1996 disclose a photopolymerizing method in which maleimide type materials are mixed with vinyl ethers and acrylates to produce a tough film. The polymerization mechanism involves a charge-transfer complex, which is formed by an electron acceptor and an electron donor. However, many of the maleimides are solid and are hardly dissolved in acrylates.

*Polymer Letters*, Vol. 6, pp. 883–88, 1968 reports that maleimide derivatives can be polymerized in the absence of photoinitiators under irradiation by ultraviolet light. Japanese Patent Applications JP-A-61-250064, JP-A-62-64813, and JP-A-62-79243 teach energy curable compositions comprising maleimide derivatives such as alkylmaleimides and arylmaleimides. However, these maleimide derivatives show low photoinitiator properties, therefore making it necessary to use substantial amounts of photoinitiator in the maleimide compositions.

U.S. Pat. No. 3,920,618 and Japanese Patent applications JP-A-50-123138 and JP-A51-47940 disclose photopolymerizable polymers having an α-aryl substituted maleimide group at a side chain. It is well known that these pendant type maleimides can be crosslinkable by ultraviolet irradiation (i.e. 2+2 photocycloaddition reaction). U.S. Pat. No. 4,079,041 and Europe Patent 21019 teach polymers having side chain type maleimide groups with alkyl substituents. However, these pendant type maleimides cannot be used to form linear polymers by photopolymerization. Therefore they are most commonly used to prepare negative printing plates. In addition, the photocross-linking dimerization reaction takes a rather long time (several tens seconds to several minutes) even with an excess amount of irradiation energy.

*Polymer Materials Science and Engineering*, Vol. 72, pp. 470–72, 1995 and *Proceedings of RadTech Europe 95*, pp. 34–56, 2995 disclose photocurable compositions comprising maleimide derivatives as electron acceptors and vinyl ethers as electron donors. The photopolymerizable compositions 1,4-bis (vinyloxymethyl) cyclohexane and N-cyclohexylamalemide or 4-hydroxybutyl vinyl ether and N-(hydroxyalkyl) maleimide, illustrated in these documents are polymerized upon ultra violet irradiation in the absence of a photoinitiator. However, hardening of the coated films does not occur; i.e. the coated films maintain liquid states after ultraviolet irradiation.

WO 98/07759 describes energy curable compositions wherein water-soluble maleimides are copolymerized with acrylates in the absence of water to produce a cured film.

The polymerizing methods described above share numerous problems, which can be summarized as the need for high irradiation intensity to cure sufficiently; the maleimide derivatives being solid at ambient temperature which does not suggest whether they are or can be homo-polymerized upon irradiation in the absence of a photoinitiator; difficulty in obtaining cured coating with practical properties and given the wide range of curable composition disclosed; the need for higher irradiation energy than practical for cross-linking (photodimerization). However, none of these references describe active energy curable compositions containing water or energy curable compositions that are water compatible.

It is an object of the present invention to provide active water compatible energy curable compositions which do not contain photoinitiator, cause unpleasant odors upon curing or cause yellowing, or exude materials from the cured film upon contact with water or solvent. Another object of the present invention is to provide an active water compatible energy curable composition which be photopolymerized by an energy source of practical intensity and energy value and results in coatings that exhibit cure rates, gloss, hardness and solvent resistance values comparable to these of conventional energy cure systems employing photoinitiators.

SUMMARY OF THE INVENTION

The present invention is an active water curable energy curable composition comprising a water compatible compound, water and a maleimide derivative represented by the Formula (1):

(1):

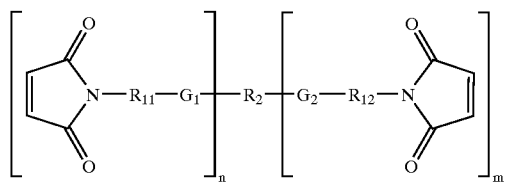

wherein n and m each independently represent an integer of 1 to 5, and the sum of m and n is 6 or smaller;

$R_{11}$ and $R_{12}$ each independently represent a linking group selected from the group consisting of a straight or branched chain alkylene group, an alicyclic group, an arylalkylene group, and a cycloalkylalkyene group. The arylalkylene group and the cycloalkyl alkylene group may have an aryl or cycloalkyl group as a main chain or a branched chain, respectively;

$G_1$ and $G_2$ each independently represent ester linkage represent by —COO— or —OCO— and;

$R_2$ represents a linking chain having an average molecular weight of 100 to 100,000 selected from the group consisting of (poly)ether and (poly) ester linking chains, in which at least one group consists of a group or groups selected from a straight or branched chain alkylene group, an alkylene group having a hydroxyl group, an alicyclic group, an aryl group, and an arylalkylene group; and connected via at least one linkage selected from the group consisting of an ether and ester linkage.

DETAILED DESCRIPTION OF THE INVENTION

The active water curable energy curable compositions of the present invention contain a maleimide derivative of Formula 1 mentioned above. As for variables $R_{11}$ and $R_{12}$ of Formula 1, examples $R_{11}$ and $R_{12}$ suitable for use in the present invention include straight alkylene groups such as methylene group, ethylene group, trimethylene group, tetramethylene group, pentamethylene group, hexamethylene group, heptamethylene group, octamethylene group, nonamethylene group, decamethylene group, undecamethylene group, dodecametheyine group, and the like; alkylene groups having a branched alkyl group such as 1-methylethylene group, 1-methyl-trimethylene group, 2-methyl-trimethylene group, 1-methyl-tetramethylene group, 2-methyl-tetramethylene group, 1-methyl-pentamethylene group, 2-methyl-pentamethylene group, 3-methyl-pentamethylene group, neopentyl group, and the like; alicyclic groups such as cyclopentylene group, cyclohexylene group and the like; arylalkylene groups having an aryl group at a main chain or a side chain such as benzylene group, 2,2-diphenyl-trimethylene group, 1-phenyl-ethylene group, 1-phehyl-tetraethylene group, 2-phenyl-tetraethylene group, and the like; cycloalkyl-alkylene group having an alicyclic group at a main chain or a side chain such as cyclohexyl-methylene group, 1-cyclohexyl-ethylene group, 1-cyclohexyl-tetraethylene group, 2-cyclohexyl-tetraethylene group, and the like. However, there are no particular limitations placed on these groups. When the average molecular weight of $R_2$, as a (poly)ether or (poly)ester linking chain is less than 100, curing properties of the maleimide thereof are worse. Even if the compositions are cured, the [gel fraction] of the energy cured composition tends to be lower.

The gel fraction is the percentage of material remaining after a cured film has been refluxed, for example, in methyl ethyl ketone for 3 hours at 80° C., then dried at 100° C. for one hour. A cured maleimide derivative or composition, which has a 99.8% gel fraction, indicates that only 0.2% of the matrix was solubilized by the above reflux conditions. (i.e. a high degree of conversion).

The percentage conversion is defined as the ration of functional groups to a crosslinked matrix monitored by the disappearance of and IR absorption band during the course of 20 irradiation. This real time IR measurement allows one to quantify percent conversion and provides insight into the reactivity the composition during irradiation.

BRIEF OF DESCRIPTION OF THE DRAWINGS

Figure 2:
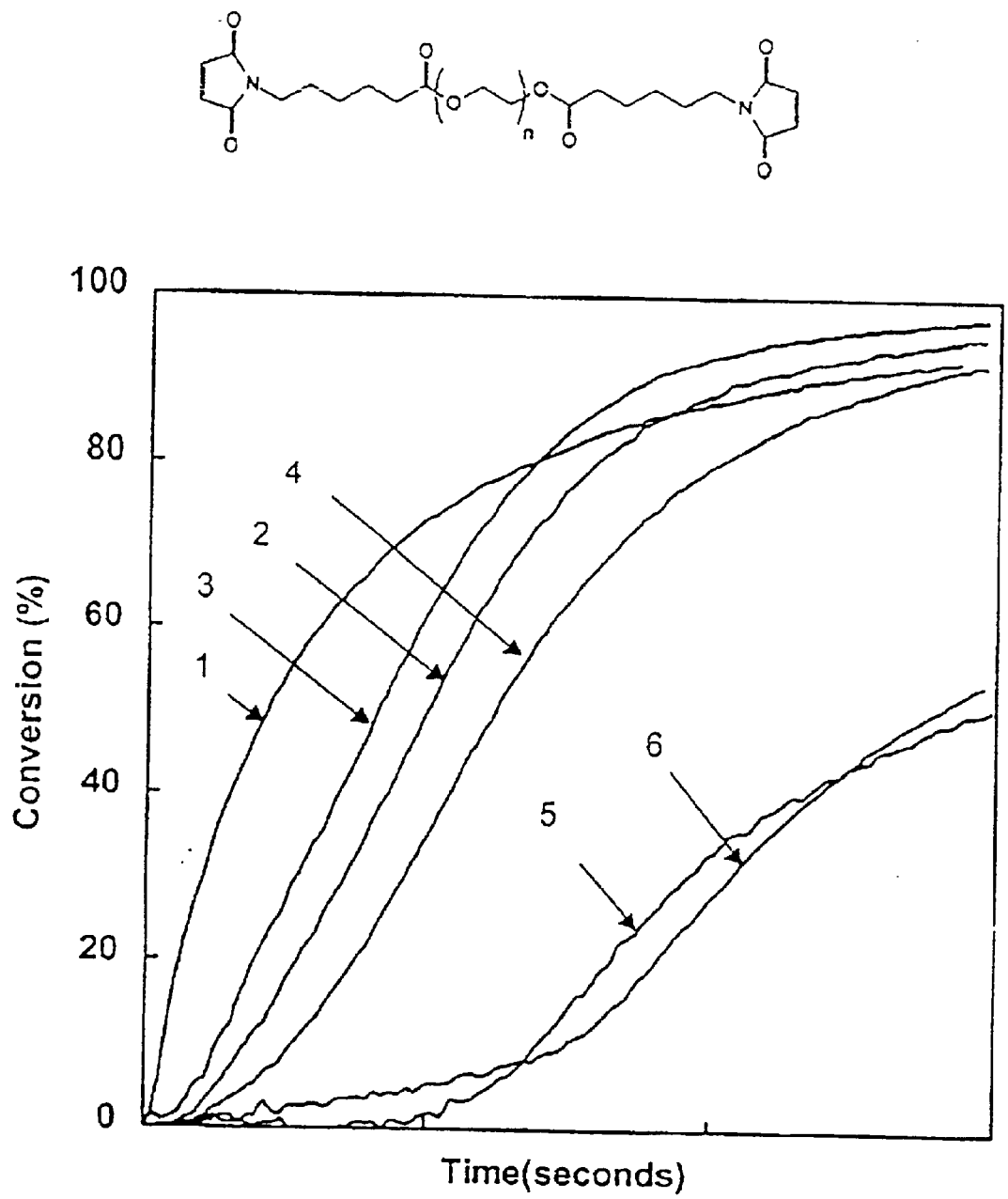

FIGS. 1 and 2 show a plot of the percent conversion of maleimide to polymerized maleimide material over time as measured by real time infra red analysis.

As mentioned above, as the molecular weight of $R_2$ decreases, the curing properties of the maleimide became worse. FIG. 1 shows a plot of real time IR data for a bismaleimide derivative (structure shown) where $R_2$ is polytetramethyelene glycol. As the molecular weight of the repeat unit (n) decreases (i.e. 4000 (curve 1); 3000 (curve 2); 1000 (curve 3); 650 (curve 4); and 250 (curve 5)) the conversion rate becomes lower. However, where the molecular weight of $R_2$ (curve 6) is less than 100, the real time IR data shows the rate of conversion to be sluggish. This supports employing maleimide derivatives wherein $R_2$ (i.e. the poly(ether), poly(ester) linking chain) is greater than 100, since a lower values yield poorer conversion rates.

FIG. 2 shows a plot of real time IR data for a bismaleimide derivative (structure shown) where $R_2$ is polyethylene glycol. As the molecular weight of the repeat unit (n) decreases (i.e. 1000 (curve 1); 600 (curve 2); 400 (curve 3); 300 (curve 4)) the conversion rates becomes lower. However, where the molecular weight of $R_2$ (curves 5 and 6) is less than 100, the real time IR data shows the rate of conversion to be sluggish.

Therefore, the results from FIGS. 1 and 2 suggest that the average molecular weight of $R_2$ be more than 100. On the other hand, when the average molecular weight of $R_2$ is more than 100,000, such as in the case of a polyol or a polyester, the raw material for the linking chains is solid in nature and shows poor solubility in common solvents at ambient temperature. Once obtained, these maleimide derivatives are virtually insoluble in common solvents, therefore, making it difficult to obtain a film and cure it. Even if a cured coating film is obtained, the surfaces of the coating shows unevenness. Therefore, it is not suitable that the average molecular weight of $R_2$ be more than 100,000. $R_2$ may also be a linkage comprising an oligomer or a polymer containing the above described (poly) ether and (poly) ester groups as repeating unite. Examples of $R_2$ suitable for use in the present invention include (poly)ether or a (poly)ester linking chains having an average molecular weight in a range of 100 to 100,000.

Linking chains represented by $R_2$ include: a (poly)ether (poly)ol residue group; a (poly)ester (poly)ol residue group; a (poly) carboxylate {(poly)ether (poly)ol} ester having a polycarboxylic acid residue group at a terminal end; a (poly)carboxylic acid residue group at a terminal end; a (poly) carboxylate {(poly)ester (poly) ol} ester having a polycarboxylic acid residue group at a terminal end; and (poly) epoxide forming the linking chains.

Linking chains represented by a (poly)ether (poly)ol residue group have an average molecular weight of 100 to 100,000, and comprising a part in which at least one group selected from the group consisting of a straight or branched chain $C_2$–$C_{24}$ alkylene group; a $C_3$–$C_{24}$ alicyclic group; and a $C_6$–$C_{24}$ aryl group, connected with an ether linking chain or a repeating unit thereof. Examples (poly) ether (poly)ol constructing linking chain include polyalkylene glycols such as polyethylene glycol, polypropylene glycol, polybutylene glycol, polytetramethylene glycol, and the like; modified alkylene glycols in which ethylene glycol, propanediol, propylene glycol, tetramethylene glycol, pentamethylene glycol, hexanediol, neopentyl glycol, glycerin, trimethylolpropane, pentraeythritol, diglycerin ditrimethylolpropane, dipentaerythritol and the like, are modified by ethylene oxides, propylene oxides, butylenes oxides and tetrahydrofuran. Among these (poly) ether (poly) ols, modified alkylene glycols are preferable. In addition, examples of (poly)ether (poly)ol constructing the above linking chain include hydrocarbon polyols such as a copolymer of ethylene oxide and propylene oxide, a copolymer of propeylene glycol and tetrahydrofuran, a copolymer of ethylene glycol and tetrahydrofuran, polyisoprene glycol, hydrogenated polisoprene glycol, polybutadiene glycol, hydrogenated polybutadiene glycol, and the like; polyhydric alcohol compounds such as polytetramethylene hexaglycerin ether (modified hexaglycerin by tetrahydrofuran), and the like. However, there are no particular limitations placed on these (poly)ether (poly)ols.

Linking chains represented by a (poly)ester (poly)ol residue group have an average molecular weight of 100 to 100,000, and comprising a part in which at least one group selected from the group consisting of a straight or branched chain $C_2$–$C_{24}$ alkylene group; a $C_3$–$C_{24}$ alicyclic group; and $C_6$–$C_{24}$ aryl group; connected with an ester linking chain or a repeating unit thereof. Examples of (poly)ester (poly)ol constructing the linking chain include (poly)alkylene glycols such as polyethylene glycol, polypropylene glycol, polybutylene glycol, polytetramethylene glycol, ethylene glycol, propane diol, propylene glycol, tetramethylene glycol, pentamethylene glycol, hexane diol, neopentyl glycol, glycerin, trimethylolpropane, pentaerythrithol, diglycerin, ditrimethylolpropane, dipentaerythritol, diglyercin, ditrimethylolopropane, pentaerythritol, diglyercin, ditrimethylolopropane, dipentaerythirtol, and the like which are modified by ε-caprolactone, γ-butrolactone, δ-valerolacton, and methylval rolactone; aliphatic polyester polyols which are synthesized by esterification of aliphatic dicarboxylic acids such as adipic acid, dimeric acid, and the like with polyols such as neopentyl glycol, methylpentanediol, and the like; aromatic polyester polyols which are synthesized by esterification of aromatic dicarboxylic acids such as terephthalic acid, and the like with polyols such as neopentyl glycol, and the like; ester compounds obtained by esterification of polyhydric alcohols such as polycarbonate polyol, acryl polyol, polytetramethylenehexaglyceryl ether (modified hexglycerin by tetrahydrofuran), and the like, with dicarboxylic acids such as fumaric acid, phthalic acid, isophthalic acid, itaconic acid, adipic acid, sebacic acid, maleic acid, and the like; compounds having polyol group such as monoglyceride obtained by transesterification of polyhydric alcohols such as glycerin with animal and plant fatty acid esters; and the like. However, there are no particular limitations placed on these (poly) ester (poly)ols. Linking chains represented by a (poly)carboxylate {(poly)ether (poly)ol} ester having a polycarboxylic acid residue group at a terminal end, obtained by esterification of (poly)ether (poly)ol with $C_2$–$C_6$ carboxylic acid (the term of "$C_2$–$C_6$ carboxylic" is abbreviated as a polycarboxylic acid hereinafter), which have an average molecular weight of 100 to 100,000, and comprising a part in which at least one group selected from the group consisting of a straight or branched chain $C_2$–$C_{24}$ alkylene group; a $C_3$–$C_{24}$ alicyclic group; and a $C_6$–$C_{24}$ aryl group; connected with an ether linking chin or a repeating unit comprising the parts. Examples of (poly) carboxylate {(poly)ester (poly)ol} ester having polycarboxylate acid at a terminal, which forms the linking chain include (poly) carboxylate {(poly)ether (poly)ol} esters having polycarboxylic acid at a terminal end which are obtained by esterification of polycarboxylic acids such as succinic acid, adipic acid, phthalic acid, hexhydrophthalic acid, tetrahydrophthalic acid, fumaric acid, isophthalic acid, itaconic acid, sebacic acid, maleic acid, trimellitic acid, pyomellitic acid, benezenepentacarboxylic acid, benzenehexacarboxylic acid, citric acid, tetrahydrofurantetracarboxylic acid, cyclohexanetricarboxlic acid, and the like with (poly)ether (poly)ols disclosed in the above, and the like. However, there are no particular limitations placed on these esters.

Linking chains represented by a (poly) carboxylate{(poly) ester (poly)ol} ester having a polycarboxylic acid residue at the terminal end obtained by esterification of (poly)ester (poly)ol and polycarboxylic acid which have an average molecular weight of 100 to 100,000, and comprising a part in which at least one group selected from the group consisting of a straight or branched chain $C_2$–$C_{24}$ alkylene group; a $C_3$–$C_{24}$ alicyclic group; and a $C_6$–$C_{24}$ aryl group; connected with an ether and an ester linking chains, or a repeating unit comprising the parts. Examples of (poly) carboxylate {(poly) ester (poly)ol} ester having polycarboxylic acid at a terminal, which forms the linking chain include (poly)carboxylate {(poly)ester (poly)ol} ester having polycarboxylic acid at a terminal end which is obtained by esterification of polycarboxylic acids such as succinic acid, adipic acid, phthalic acid, hexahydrophthalic acid, tetrahydrophthalic acid, fumaric acid, isophthalic acid, itaconic acid, sebacic acid, maleic acid, trimellitic acid, pyromellitic acid, benezenepentacarboxylic acid, benzenehexacarbonoxylic acid, citric acid, tetrahydrofurantetracarboxylic acid, cyclohexanetricarboxylic acid, and the like with (poly) ester (poly)ols disclosed in the above, and the like. However there are no particular limitations placed on these esters.

Linking chains obtained by ring-open reaction of polyespoxides having an average molecular weight of 100 to 100,000, and comprising a part in which at least one group selected from the group consisting of a straight or branched chain $C_2$–$C_{24}$ alkylene group; a $C_1$–$C_{14}$ alicyclic group; and $C_1$–$C_{24}$ aryl group; connected with an ether linking chain, or a repeating unit comprising the parts, and the like. However, there are no particular limitations placed on these linking chains. Examples of (poly) epoxide forming the linking chain include epichlorohydrin-modified bisphenol type epoxy resin synthesized by the reaction of (methyl) epicholorohydrin with bisphenol A, bisphenol F, modified ethylene oxide thereof, modified propylene oxide thereof; epichlorohydrin-modified hydrogenated bisphenol type epoxy resin synthesized by the reaction of (methyl) epichlorohydrin with hydrogenated bisphenol A and hydrogenated bisphenol F, and by the reaction of ethylene oxide-modified or propylene oxide modified hydrogenated bisphenol A and bisphenol F; epoxy novolak resin; compounds obtained from the reaction of phenol, bisphenol, and the like with (methyl) epichlorohydrin; aromatic epoxy resin such as glycidyl ester of terephthalic acid, isophthalic acid, pyromellitic acid, and the like; polyglycidyl ethers synthesized from glycols such as (poly)ethylene glycol, (poly)propylene glycol, (poly)butylene glycol, (poly)tetramethylene glycol, neopentyl glycol, and from alkylene oxide-modified glycols thereof; polyglycidyl ethers synthesized from aliphatic polyhydric alcohols such as trimethylol propane, trimethylol ethane, glycerin, diglycerin, erythritol, pentaerythritol, sorbitol, 1,4-butane diol, 1,6-hexane diol, and the like, and from alkylene oxide-modified aliphatic polyhydric alcohols thereof; glycidyl esters synthesized from adipic acid, sebacic acid, maleic acid, itaconic acid, and the like; glycidyl ether of polyester polyol synthesized from polyhydric alcohol with polycarboxylic acid; copolymers such as glycidyl (meth)acrylate and methylglycidyl (meth)acrylate; aliphatic epoxy resin such as glycidyl ester of higher fatty acid, epoxidized linseed oil, epoxidized soybean oil, epoxidized castor oil, epoxidized polybutadiene; and the like. However, there are no particular limitations paced on these (poly) epoxides.

Among the linking chains $R_2$ represents, preferred are (poly) ether and (poly) ester linking chains having an average molecular weight of 100 to 100,000 and comprising a repeating unit containing a $C_2$–$C_{24}$ straight chain or branched alkylene, a $C_2$–$C_{24}$ alkylene group having a hydroxyl group, and/or a $C_6$–$C_{24}$ aryl group.

The maleimide derivatives represented by Formula (1) used for an active energy curable composition of the present invention can be synthesized by well known techniques from the reaction of, for example, a maleimide compound having a carboxyl group with a compound reactable with the carboxyl groups or from the reaction of maleimide compound having a hydroxyl group with a compound having a carboxyl group.

A maleimide compound having a carboxyl group can be synthesized by well known techniques from the reaction of maleic anhydride with a primary amino carboxylic acid, represented by the following reaction formula. (for example, see D. H. Rich, et al., *Journal of Medical Chemistry*, Vol. 18, pp. 1004–10, 1975).

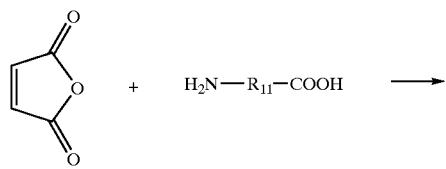

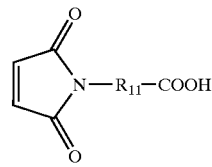

Examples of a primary amino carboxylic acid suitable for use in such synthesis includes asparagine, alanine, β-alanine, arginine, isoleucine, glycine, glutamine, tryptophan, threonine, valine, phenylalanine, homophenylalanine, α-methyl-phenylalanine, lysine, leucine, cycloleucine, 3-aminoproprionic acid, α-aminobuytric acid, 4-aminobutyric acid, aminovalieric acid, 6-aminocaproic acid, 7-aminoheptanoic acid, 2-aminocarprylic acid, 3-aminocaprylic acid, 6-aminocaprylic acid, 8-aminocaprylic acid, 2-aminonoanoic acid, 4-aminonoanoic acid, 9-aminonoanoic acid, 2-aminocapric acid, 9-aminocapric acid, 10-aminocapric acid, 2-aminocapric acid, 9-aminocapric acid, 10-aminocapric acid, 2-aminoundecanoic acid, 10-aminoundecanoic acid, 11-aminoundecanoice acid, 2-aminolauric acid, 11-aminolauric acid, 12-aminolauric acid, 2-aminotridecanoic acid, 13-aminotridecanoic acid, 2-amino myristic acid, 14-amino myristic acid, 2-aminopentadecanoic acid, 15-aminopentadecanoic acid, 2-aminopalmitic acid, 16 aminotpalmitic acid, 2-aminoheptadecanonic acid, 17-aminoheptadecanoic acid, 2-aminostearic acid, 18-aminostearic acid, 2-aminoeicosancoic acid, 20-aminoesicosanoic acid, aminocyclohexanecarboxylic acid, aminomethylcyclhexanecarboxylic acid, 2-amino-3propionic acid, 3-amino-3phenylpropionic acid, and the like. However, there are no particular limitations placed on these primary amino carboxylic acids as virtually any primary amino carboxylic acid can be used. In addition, pyrrolidone, lactams such as δ-valerolactam, ε-carpolactam, and the like can also be used.

Examples of compounds reactive with the carboxyl groups include polyols or polyespoxides having 2 to 6 functional groups and an average molecular weight of 100 to 100,000 comprising a part or a repeating unit in which at least one linking group selected from the group consisting of a straight chain alkylene group, a branched alkylene group, and alicyclic group and an aryl group is linked with an ether bond and/or an ester bond.

There are no particular limitations placed on the reaction between maleimide compounds having a carboxyl group and polyols one of the compound reactive with the carboxyl groups. Moreover, maleimide derivatives represented by Formula (1) can be synthesized in a well-known manner disclosed in Organic Synthesis Collective Volume (C. E. Rehberg, et al., Vol. 3, pp. 46, 1955). It is preferable, however, that the reaction be carried out under ambient or reduced pressure, and a temperature ranging from room temperature to 150° C., while dehydrating and using a catalyst. Examples of the catalyst include acid catalysts such as sulfuric acid, phosphoric acid, methanesulfonic acid, benzenesulfonic acid, p-toulensesulfonic acid, strong acidic cation-exchange resin and the like. The amount of catalyst used should be within a range of 0.01 to 10 wt. % based on the total weight of raw materials. Moreover, an azeotropic organic solvent with water is also used as a solvent in the reaction. Examples of the azeotropic organic solvent with water include toluene, benzene, butyl acetate, ethyl acetate, diisopropyl ether, dibutyl ether, and the like.

There are no particular limitations placed on the reaction of the maleimide compounds having a carboxyl group with polyepoxides, which are one of the reactive compounds with the carboxyl groups. In addition, maleimide derivatives represented by Formula (1) can be synthesized in a well-known manner disclosed in Japanese Patent Application JP-A4-228529. It is preferable, however, that the reaction be carried out at a temperature in a range of room temperature to 150° C., using a catalyst. Examples of the catalyst include imidazoles such as 2-methylmidazole and the like; quaternary ammonium salts such as tetramethyl ammonium chloride, trimethylbenzyl ammonium chloride, tetramethyl ammonium bromide and the like; amines such as trimethylamine, triethylamine, benzylmethylamine, tributylamine, and the like; phosphines such as triphenylphoshine, tricyclohexylphosphine, and the like; laurates such as dibutylin laureate, and the like; basic alkali metal salts such as potassium acetate, potassium tertiary phosphate, sodium acrylate sodium methacrylate and the like; alkali alcoholates such as sodium methylate, potassium ethylate, and the like; anion exchange resins; and the like. The amount of catalyst should be within a range of 10 to 10,000 ppm based on the total weight of raw materials.

Moreover, an organic solvent, which does not comprise a reactive hydrogen, may also be used as a solvent in the reaction. Examples of an organic solvent which does not comprise a reactive hydrogen include aromatic hydrocarbons such as toluene, ethylbenzene, tetralin, cumene, xylene and the like; ketone, cyclohexanone, and the like; esters such as formate, methyl acetate, ethyl acetate, n-butyl acetate, and the like.

Examples of polyols used as a compound reactive with the carboxyl groups include, for example, polyalkylene glycols such as polyethylene glycol, polypropylene glycol, polybutylene glycol, polytetramethylene glycol, and the like; modified alkylene glycols modified of alkylene glycols such as ethylene glycol, propanediol, propylene glycol, butanediol, butylene glycol, hexanediol, neopentyl glycol, glycerin, trimethylolpropane, pentaerythritol, diglycerin, ditrimethylolpropane, dipentaerythritol, and the like by ethyleneoxide, propylene oxide, butyleneoxide, tetrahydrofuran, ε-caprolactone, γ-butylolactone, δ-valerolactone, and methylvalerolactone; aliphatic polyols such as a copolymer of ethylene oxide with propylene oxide, a copolymer of propylene glycol with tetrahydrofuran, a copolymer of ethylene glycol with tetrahydrofuran, polyisoperene glycol, hydrogenated polyisoprene glycol, polybutadiene glycol, hydrogenated polybutadiene glycol, and the like; aliphatic polyester polyols which are the esterification reaction products of aliphatic dicarboxylic acids such as adipic acid and dimeric acid with polyols such as neopentyl glycol and methylpentanediol, and the like; aromatic polyester polyols which are the esterification reaction products of aromatic dicarboxlic acids such as terephthalate with polyols such as neopentyl glycols; polycarbonate polyols; acrylpolyols; polyhydric alcohols such as polytetramethylenehexaglycerin ether (tetrahydrofuran-modified hexaglycerin); compounds containing monohydroxyl group with polyhydroxy groups, and having an ether group at terminal ends of the polyhydric alcohols described above; compounds containing polyhydroxyl groups obtained by the esterification reaction of the above polyhydric alcohols with dicarboxylic acids such as fumaric acid, phthalic acid, isophthalic acid, itaconic acid, adipic acid, sebacic acid, maleic acid, and the like; compounds containing polyhydroxyl groups obtained by the transesterification reaction of compounds containing polyhydroxyl groups such as glycerin with ester of fatty acids of animals and plants. Any polyols maybe used if they contain 2 to 6 hydroxyl groups in the molecule.

Examples of polyepoxides used as the compound reactive with the carboxyl groups include, for example, bisphenol type epoxy resins modified by epichlorohydrin, which are synthesized by (methyl)epichlorohydrin with bisphenol A, and bisphenol F, and their modified compounds by ethyleneoxide, propyleneoxide, and the like; hydrogenated bisphenol type epoxy resins and epoxy Novolak® resins (Novolak is a Registered Trademark of Shell Company, Houston, Tex.) modified by epichlorhydrin which are synthesized by (methyl) epichlorhydrin which are synthesized by (methyl) epichlorhydrin with hydrogenated bisphenol A, hydrogenated bisphenol F, and their modified compounds by ethyleneoxide propyleneoxides, and the like; reaction products of (methyl) epichlorhydrin with phenol and biphenol; aromatic epoxy resins such as glycidil esters of terephthalic acid, isophthalic cid, and pyrrolitic acid; polyglycidyl ethers of glycols such as (poly)ethylene glycol, (poly) propylene glycol, (poly)butylene glycol, (poly) tetramethylene glycol, and their alkyleneoxide-modified products; glycidyl ethers modified of aliphatic polyhydric alcohols such as trimethlolpropane, trimethylolethane, glycerin, diglyercin, erythritol, pentaerythritol, sorbitol, 1 4-butanediol, 1,6-hexanediol, and their alkyleneoxide-modified compounds; glycidyl esters of carboxylic acids such as adipic acid, sebacic acid, maleic acid, and itaconic acid; glycidyl ethers of polyester polyols prepared by polyhydric alcohols and polycarboxylic acids; copolymers of glycidyl (meth) acrylate and methylglycidyl (meth) acrylate; aliphatic epoxy resins such as glycidl esters of higher fatty acids, epoxidized linseed oil, epoxidized soybean oil, epoxidized castor oil, and epoxidized polybutadiene.

The maleimide derivatives represented by Formula (1) used for an active energy curable composition of the present invention can also be synthesized by the reaction of a maleimide compound having a hydroxyl group with a compound having a carboxyl group.

Moreover, a maleimide compound having a hydroxyl group can be synthesized by maleimide and formaldehyde, represented by the reaction:

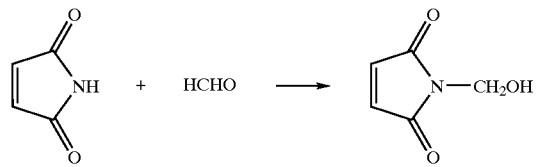

or by a well-known technique using maleic anhydride and a primary amino alcohol represented by the reaction:

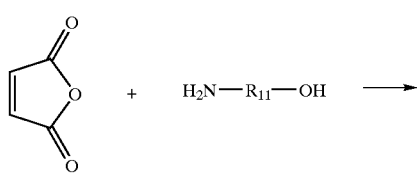

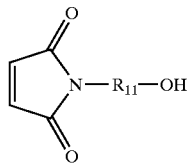

(for detailed synthesis example, see U.S. Pat. No. 2,526,517 and Japanese Patent Application JP-A-2-268155).

Examples of a primary amino alcohol include 2-aminoethanol, 1-amino-2-propanol, 3-amino-1-propanol, 2-amino-2-methyl-1-propanol, 2-amino-3-phenyl-1-propanol, 4-amino-1-butanol, 2-amino-1-butanol, 2-amino-3-methyl-1-butanol, 2-amino-4-methylthio-1butanol, 2-amino-1-pentanol, 5-amino-1-pentanol, (1-aminocyclopentane) methanol, 6-amino-1-hexanol, 2-amino-1-hexanol, 7-amino-1-heptanol, 2-(2-aminoethoxy) ethanol, N-(2-aminoethyl) ethanol amine, 4-amino-1-piperazne ethanol, 2-amino-1-phenylethanol, 2-amino-3-phenyl-1-propanol, 1-aminomethyl-1-cyclohexanol, aminotrimethylcyclohexanol, and the like. However, there are no particular limitations placed on these primary amino alcohols. Any primary amino alcohol can be used.

Examples of compounds reactive with the hydroxyl groups include polycarboxylic acid having ether bonds and/or ester bonds in one molecule, and an average molecular weight of 100 to 100,00, and the comprising a part or a repeating unit in which at least one linking group selected from the group consisting of a straight chain alkylene group, a branched alkylene group, an alicyclic group, and an aryl group; linked with an ether bond and/or an ester bond.

There are no particular limitations placed on the reaction between the maleimide compounds having a hydroxyl group and the compounds having a carboxyl group. In addition, maleimide derivatives represented by Formula (1) can be synthesized in a well-known manner disclosed in Organic Synthesis Collective Volume (C. E. Rehberg, et al., Vol. 3, pp. 46, 1955). It is preferable, however, that the reaction be carried out under ambient or reduced pressure, at a temperature ranging from room temperature to 150° C. while dehydrating and using a catalyst. Examples of the catalyst include acid catalysts such as sulfuric acid, phosphoric acid, methanesufonic acid, benzenesulfonic acid, p-toluenesulfonic acid, strong acid cation-exchange resin, and the like. The amount of catalyst should be within a range of 0.01 to 10 wt. % based on the total weight of raw materials.

In this case, as the solvent for the reaction, it is possible to use organic solvents, which are azeotropic with water. Examples of such organic solvents are toluene, benzene, butyl acetate, ethyl acetate, diisopropryl ether, and dibutyl ether, and the like.

In any cases of the above reactions, it is preferable to use a radical polymerization inhibitor in order to suppress the radical polymerization of maleimide groups. The radical polymerization inhibitors include, for example, phenol, derivatives such as hydroquinone, tert-butylhydroquinone, methoquinone, 2,4-dimethyl-6-tert-butylphenol, catecol, tert-butylcatecol, and the like; amines such as phenothiazine, p-phenylenediamine, diphenylamine and the like; copper complexes such as copper-dimethyldithiocarbamate, copper-diethyldithiocarbamate, copper-dibutyldithiocarbamate, and the like. These inhibitors may be used alone or in combinations of two or more. It is preferable to select an amount of the inhibitors within a range of 10 to 10,000 ppm against total weight of raw materials.

Examples of polycarboxylic acids as the compounds, having ether bonds and ester bonds, include, for example, but are not limited to, polycarboxylic acids obtained by esterification or dicarboxylic acids such as fumaric acid, phthalic acid, isophthalic acid, itaconic acid, adipic acid, sebacic acid, maleic acid, succinic acid, hexahydrophthalic acid, tetrahydrophthalic acid, pyromellitic acid, and dicarboxylic acid described above with polyols described above, and represented by formula:

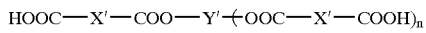

wherein x' represents residual diarboxyl groups, Y' represent residual polyol groups, and n is an integer from 1 to 5.

The maleimide derivatives represented by Formula (1) and used for the active energy curable composition of the present invention are obtained by aforementioned preparatory methods, but are not limited to, the methods described herein.

It is possible to add a compound, which copolymerizable with the maleimide groups to be used together in the active energy curable composition containing maleimide derivatives according to the present invention. Practical examples of the compounds, which are copolymerizable with the maleimide groups, are, for example, compounds having various unsaturated double bonds. Such compounds may include, for example, maleimide derivatives which are not represented by the above Formula (1), (meth)acryoyl derivatives, (meth)acrylamide derivatives, vinyl ester derivatives, vinyl carboxylate derivatives, styrene derivatives, and unsaturated polyesters.

Examples of maleimide derivatives which are not represented by Formula (1) include, for example, but are not limited to:

monofunctional aliphatic maleimides such as N-methylmaleimide, N-ethylmalemide, N-propylinaleimide, N-nbutylmaleimide, N-tert-butylmaleimide, N-pentylmaleimide, N-hexylmaleimide, N-laurylmaleimide, 2-maleimideethyl-ethylcarbonate, 2-maleimideethyl-isopropyl-carbonate, and N-ethyl-(2-malemideethyl) carbamate; monofunctional alicyclic maleimides such as N-cyclohexylmaleimide: aromatic monofunctional maleimides such as N-phenylmaleimide, N-2methylphenylmaleimide, N-2-ethylphenylmaleidmide, N-(2,6-diethylphenyl) maleimide, N-2-chlorophenylmaleimide, and N-(4-hydroxyphenyl) maleimide;

aliphatic bismaleimides such as N, N' methylenebismaleimide, N,N'-ethylenebismaleimide, N, N' trimethylenebismaleimide, N,N'-hexamethylenebismaleimide, N,N'-dodecamethylenebismaleimide, polypropylene glycol-bis (3-maleimidepropyl) ether, tetraethylene glycol-bis (3-maleimidepropyl) ether, and bis(2-maleimideethyl) carbonate;

alicyclic bismaleimides such as 1,4-dimaleimide-cyclohexane and isophoronebisurethanebis (N-ethylmalemide); aromatic bismaleimides such as N,N'-(4,4"-diphenyl-methane) bismaleimide, N,N'-(4,4'-diphenyloxy) bismaleimide, N, N'-p-phenylenebismaleimide, N,N'-m-phenylenebismaleimide, N,N'-2,4-tolylenebismaleimide, N,N'-2,6-tolylenebismaleimide N,N'-[4,4'-bis(3,5-dimethylphenyl) methane] bismaleimide, N,N'-[4,4'-bis(3,5-diethylphenyl) methane] bismaleimide;

(poly)urethane (poly)maleimide derivatives obtained by urethanation reactions of hydroxymaleimides with various (poly)isocyanantes, such as a maleimide derivative obtained by a urethanation reaction of hydroxyethylmaleimide with triisocynate produced by a reaction between 3 mole of isophoronediisocynante and 1 mole of propyleneoxide-modifified-glycerin;

a maleimide derivative obtained by a urethanation reaction of hydroxymethylmaleimide with diisocyanate produced by a reaction between 2 moles of 2,4-toluenediisocynante and 1 mole of polytetramethyleneglycol; and compounds having acryloyoxyl groups or methacryloyoxy groups can be classified into, but are not limited to, groups of (poly)ester (meth)acrylate; urethane (meth)acrylate; epoxy (meth)acrylate; (poly)ether (meth)acrylate; alkyl (meth) acrylate or alkylene (meth)acrylate; (meth) acrylate having an aromatic ring and; (meth)acrylate having an alicyclic group.

Names in the above classification are used as the general terms for respective compounds, which can be used together in the active energy curable composition of the present invention. The (poly)ester (meth)acrylate generally designates (meth)acrylates having at least one ester bond in the main chain; urethane (meth)acrylate generally designates (meth)acrylates having at least one urethane bond in the main chain; the epoxy acrylate generally designates (meth) acrylates obtained by a reaction between (meth)acrylic acid and epoxide with one and more than one functional group the (poly)ether (meth)acrylate generally designate (meth) acrylates having at least one ether bond in the main chain; the alkyl(meth)acrylates or alkylene (meth)acrylate generally designates (meth)acrylates comprising the main chain formed by a linear alkyl, a branched alkyl, a linear alkylene, or a branched alkylene, and side chains or terminal ends having halogen atoms and/or hydroxyl groups; (meth) acrylate having an aromatic ring generally designates (meth) acrylate having an aromatic ring at the main chain or the side chain; (meth)acrylate having an alicyclic group generally designates (meth)acrylates having, in the main chain or the side chain, alicyclic groups which may include oxygen atoms or nitrogen atoms as the structural unit.

Examples of the (poly)ester (meth)acrylates which can be used together in the active energy curable composition of the present invention include, for example, but are not limited to, monofunctional (poly)ester (meth)acrylates such as alicyclic-modified neopentylglycol (meth)acrylate, caprolactone-modified 2-hydroxyethyl (meth)acrylate, ethyleneoxide-and/or propyleneoxide-modified phthalate (meth)acrylate, ethyleneoxide-modified succinate (meth) acrylate, caprolactone-modified tetrahydrafurfuryl(meth) acrylate; pivalate-esterneopentylglycoldi(meth)acrylate, caprolactone-modified hydroxypivalateesterenepentylglucoldi(meth)acrylate, epicholohydrine-modified phthalated (meth)acrylate; mono-, di or tri(meth)acrylates of triol obtained by addition of more than 1 mole of cyclic lactones such as ε-caprolactone, γ-butylolactone, δ-valerolactone or methylvalerolactone to 1 mole of trimethylolpropane or glycerin; mono-, di-tri, or tetra-(meth)acrylates of triol obtained by addition of more than 1 mole of cyclic lactones such as ε-caprolactone, γ-butylolactone, δ-valerolactone or methylvalerolactone to 1 mole of pentaerythritol or ditrimethylolopropane; mono- or poly-(meth)acrylates of polyhydric alcohols such as triol, tetraol, pentaol, or hexaol, obtained by addition of more than 1 mole of cyclic lactones such as ε-carpolactone, γ-butylolactone, δ-valerolactone or methylvalerolactone to 1 mole of dipentaerythritol; (meth) acrylates of polyester polyols composed of diol components such as (poly)ethylene glycol, (poly)propylene glycol, (poly)tetramethylene glycol, (poly)butylene glycol, (poly) pentanediol, (poly)methylpentanediol, and (poly) hexanediol, and polybasic acids such as maleic acid, fumaric acid, succinic acid, adipic acid, phthalic acid, hexahydrophthalic acid, tetrahydrophthalic acid, itaconic acid, citraconic acid, hettic acid, chlorendic acid, dimeric acid, alkenylsuccinic acid, sebacic acid, azelaic acid, 2,2,4-trimethyladipic acid, 1,4-cyclohexanedicarboxylic acid, terephthalic acid, 2-sodium-sulfoterephthalic acid, 2-potassium sulfoterephthalic acid, isophthalic acid, 5-sodium sulfoisophthalic acid, 5-potassium sulfiosophtahlic acid, orthophthalic acid, 4-sulfophthalic acid, 1,10-decamethylenedicarboxylic acid, muconic acid, oxalic acid, malonic acid, gultaric acid, trimellitic acid, pyromellitic acid; and polyfunctional (poly)ester (meth)acrylates composed of the above diol components, polybasic acids, and cyclic lactone-modified polyesterdiols such as ε-carpolactone, γ-butylolactone, δ-valerolactone or methylvalerolactone.

The urethane (meth)acrylate which can be used together in the active energy curable composition of the present invention is a general term representing (meth)acrylates obtained by a reaction between hydroxy compounds having at least one acryloyloxy group and isocyanante compounds. The urethane (meth)acrylate may also be selected from water dilutable aliphatic acrylate or aromatic urethanes.

Examples of hydroxy compounds having at least one acryloyoxy group include, for example, 2-hydroxyethyl (meth) acrylate, 2-hydroxypropyl (meth) acrylate, 2-hydroxybutyl(meth)acrylate, 3-hydroxybutyl (meth) acrylate, 4-hydroxybutyl (meth)acrylate, cyclohexanedimethanolmono(meth)acrylate, polyethylene glycol(meth)acrylate, polypropylene glycol(meth) acrylate, trimethylolpropanedi(meth)acrylate, trimethylolethanedi (meth)acrylate, pentaerythritoltri(meth) acrylate or an adduct of (methacrylate with glycidyl(meth)acrylate, (meth) acrylate compounds having hydroxyl groups such as 2-hydroxy-3-phenopropyl(meth) acrylate, and ring opening reaction products of the above acrylate compounds having hydroxyl group with as ε-caprolactone.

Examples of isocyanate compounds include, for example, aromatic diisocyanates such as p-phenylenediisocyanate, m-phenylenediisocyanate, p-xylenediisocyanante, m-xylenediisocyanante, 2,4-toluenediisocyanante, 2, 6-toluenediisocyanante, 4,4'-diphenylmethanediisocyanate, 3,3'-dimethyldiphenyl-4,4'-diisocyanate, 3,3'-diethyldiphenyl-4,4'-diisocyanate, and naphthalenediisocyanate; aliphatic or alicyclic diisocyanates such as isophoronediisocyanate, hexamethylenediisocyanate, 4,4'-dicyclohexlymethanediisocayanate, hydrogenated xylenediisocyante, norborenendiisocyanate, and lysinediisocyanate, polyisocyanates such as buret products of more than one type of isocyanates and isocyanates-trimers of the above isocyanates; and polyisocyanates obtained by the esterification reaction of the above isocyanate with various polyols.

Examples of polyols used to produce polyisocyanates include, for example, (poly)alkylene glycols such as (poly) ethylene glycol, (poly)propylene glycol, (poly)butylene glycol, and (poly)tetramethylene glycol; alkyleneglycols modified by ethyleneoxide, propyleneoxide, butyleneoxide, tetrahydrofuran, ε-caprolactone, γ-butylolactone, δ-valerolactone or methylvalerolactone, such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, and dipentaerythritol; aliphatic polyols such as copolymers of ethyleneoxide and propyleneoxide, copolymers of propylene glycol and tetrahydrofuran, copolymers of ethylene glycol and tetrahydrofuran, polyisoprene glycol, hydrogenated polyisoprene glycol, polybutadiene glycol and hydrogenated polybutadiene glycol, aliphatic polyester polyols obtained by esterification reactions between aliphatic dicarboxylic acids such as adipic acid and dimeric acid with polyols such as neopentyl glycols and methylpentanediol; aromatic polyester polyols obtained by esterification reactions between aromatic dicarboxylic acids such as terephthalic acid with polyols such as neopentyl glycol; polycarbonatepolyols; acrylpolyols; polyhydric alcohols such as polytetramethylenehexaglyceryl ether (hexaglycerin modified by tetrahydrofuran); mono- or polyhydric compounds having of the above compounds having ether group at a terminal; polyhydric compounds obtained by esterification of the compounds having polyhydroxyl groups with dicarboxylic acids such as fumaric acid, phthalic acid, isophthalic acid, itaconic acid, adipic acid, sebacic acid, and maleic acid; compounds containing polyhydroxyl group such as monoglyceride obtained by transesterification reactions of compounds having polyhydroxyl groups such as glycerin with ester of fatty acids of animals or plants.

Epoxy(meth)acrylates capable of being used together in the active energy curable composition of the present invention is a general term for (meth)acrylate obtained by a reaction of epoxides having more than one functional group and (meth)acrylic acids. Epoxides as the raw material of epoxy(meth)acrylate includes, for example, but are not limited to, epichlorhydrin-modified-hydrogenated bisphenol-type epoxy resin, synthesized by (methyl) epicholohydrin and compounds such as hydrogenated bisphenol A, hydrogenated bisphenol S, hydrogenated bisphenol F, and their modified compounds with ethylene oxide or propylene oxide; alicyclic epoxy resins such as 3,4-epoxycyclohexylmethyl-3,4-epoxycyclo hexane carboxylate, bis-(3,4-epoxycyclohexyl) adipate; alicylic epoxides such as epoxy resin containing heterocycles such as triglycidylisocyanurate, epichlorohydrin-modified bisphenyl-type epoxy resins synthesized by a reaction of (methyl) epichlorohydrin and a compound such as bisphenol A, bisphenol S, bisphenol F, and their modified compounds with ethylene oxide or propyleneoxide; phenol Novolak type epoxy resins; cresol Novolak type epoxy resins; epoxy resins of diccylopentadiene-modified phenol resin obtained by the reaction of dicyclopentadiene and various types of phenol resins; an aromatic epoxidized compounds of 2,2'6, 6'-tetramethylbisphenol; aromatic epoxides such as phenylglycidyl ether; (poly)glycidyl ethers of glycol compounds such as (poly)ethylene glycol, (poly)propylene glycol, (poly)butylene glycol, (poly)tetramethylene glycol, neopentyl glycol; (poly)glycidyl ether of glycols modified with alkylene oxide; (poly)glycidyl ethers of aliphatic polyhydric alcohols such as trimethylolpropane, trimethylolethane, glycerin, diglycerin, erythritol, pentaerythritol, sorbitol, 1,4-butanediol, 1,6-hexanediol; alkylene type epoxides of (poly) glycidyl ether modified of aliphatic polyhydric alcohols by alkylene; glycidylester of carboxylic acids such as adipic acid, sebacic acid, maleic acid, and itaconic acid; glycidyl ethers of polyesterpolyols of polyhydric alcohols with polycarboxylic acids; a copolymer of glycidyl(meth)acrylate or methglycidl(meth) acrylate; glycidylester of higher fatty acids; aliphatic epoxy resins such as an epoxydized linseed oil, an epoxydized castor oil, and an epoxydized polybutadiene.

(Poly)ether (meth)acrylates capable of being used together in the active energy curable composition of the present invention include, for example, but are not limited to, aliphatic epoxy acrylates, monofunctional (poly)ether (meth)acrylates such as butoxyethyl(meth)acrylate, butoxytriethyleneglycol(meth)acrylate, epichlorohydrin-modified butyl(meth)acrylate, dicyclopentanyloxyethyl (meth)acrylate, 2-ethoxyethyl(meth)acrylate, ethylcarbitol (meth)acrylate, 2-methoxy(poly)ethylene glycol (meth) acrylate, methoxy(poly)propylene glycol (meth)acrylate, nonylphenoxypolyethylene glycol (meth)acrylate, nonylphenoxypolypropylene glycol (meth)acrylate, phenoxyhydroxpropyl (meth)acrylate, phenoxy(poly)ethylene glycol (meth)acrylate, polyethylene glycol mono(meth)acrylate, polypropylene glycol mono(meth)acrylate; and polyethylene glycol, polypropylene glycol mono(meth)acrylate; alkylene glycol di(meth)acrylates such as polyethylene glycol di(meth)acrylate, polypropylene glycol di(meth)acrylate, polybutylene glycol di(meth)acrylate, polytetramethylene glycol di(meth) acrylate; polyfunctional (meth)acrylates induced by (meth)acrylic acid with aliphatic polyols such as a copolymer of ethylene oxide and propylene oxide, a copolymer of propylene glycol and tetrahydrofuran, a copolymer of ethylene glycol and tetrahydrofuran, polyisoprene glycol, hydrogenated polyisoprene glycol, polybutadieneglycol, hydrogenated poybutadiene glycol, polyfunctional (meth)acrylates induced by acrylic acid with polyhydric alcohols such as polytetramethylenehexaglyceryl ether (tetrahydrofuran-modified hexaglycerin); di(meth)acrylates of diol obtained by addition of equimolar or more than 1 mole of cyclic ethers such as ethylene oxide, propylene oxide, butylene oxide and/or tetrahydrofuran to 1 mole of neopentyl oxide; di(meth) acrylates of alkyleneoxide modified bisphenols such as bisphenol A, bisphenol F and bisphenol S; di(meth) acrylate of alkylene oxide-modified hydrogenated bisphenols such as hydrogenated bisphenol A, hydrogenated bisphenol F, hydrogenated bisphenol S; di(meth)acrylates of alkylene oxide-modified trisphenols; di(meth)acrylates of alkylene oxide-modified hydrogenated trisphenols; di(meth)acrylates of alkylene oxide-modified p, p'-bisphenols; di(meth)acrylates of alkylene oxide-modified hydrogenated bisphenols; di(meth) acrylates of alkylene oxide-modified p, p'-dihydroxybenzophenones, mono-, di- and tri-(meth) acrylates of triols obtained by addition of equimolar or more than 1 mole of ethylene oxide, propylene oxide, butylene oxide, and/or cyclic ethers such as tetrahydrofuran to 1 mole of trimethylelolpropane or glycerin; mono-, di-, tri- or tetraqmeth)acrylates obtained by addition of equimolar or more than 1 mole to ethylene oxide, propylene oxide, butylene oxide, and/or cyclic ethers such as tetrahydrofuran to 1 mole of pentaerylthritol, ditrimethylolpropane or highly alkoxylated trimethylolpropane triacrylate; monofunctional (poly)ether (meth)acrylates or polyfunctional (poly)ether (meth)acrylates of polyhydric alcohols such as triol, tetraol, pentaol, or hexaol of mono- or poly-(meth)acrylates obtained by addition of equimolar or more than 1 mole of ethylene oxide propylene oxide, butylene oxide, and/or cyclic ethers such as tetrahydrofuran to 1 mole of dipentaerythritol.

Alkyl (meth) acrylates or alkylene (meth)acrylates which can be used together in the active energy curable composition of the present invention include, for example, but are not limited to, monofunctional (meth) acrylates such as methyl(meth)acrylate, ethyl(meth)acrylate, propyl(meth) acrylate, isopropyl(meth)acrylate, butyl(meth)acrylate, isobutyl(meth)acrylate, pentyl(meth)acrylate, isopentyl (meth)acrylate, neopentyl(meth)acrylate, hexyl(meth) acrylate, heptyl(meth)acrylate, 2-ethylhexyl(meth)acrylate, octyl(meth)acrylate, isooctyl(meth)acrylate, nonyl(meth) acrylate, decyl(meth)acrylate, dodecyl(meth)acrylate, tridecyl(meth)acrylate, pentadecyl(meth)acrylate, miristyl (meth)acrylate, palmityl(meth)acrylate, stearyl(meth) acrylate, neryl(meth)acrylate, geranyl(meth)acrylate, farnecyl(meth)acrylate, hexadecyl(meth)acrylate, octadecyl methacrylate, docosyl(meth)acrylate, and trans-2-hexene (meth)acrylate; di(meth)acrylates of aliphatic diols such as ethylene glycol di(meth)acrylate, propylene glycol di(meth) acrylate, 1,2-butylene glycol di(meth)acrylate, 1,3-butylene glycol di(meth)acrylate, 1,4-butanediol di(meth)acrylate, 1,6-hexanediol di(meth)acrylate, neopentyl glycol di(meth) acrylate, 2-methyl-1,8-octanediol di(meth) acrylate 1,9-nonanediol di(meth)acrylate, and 1,10-decanediol di(meth) acrylate; mono(meth)acrylates or poly(meth) acrylates of polyhydric alcohols such as trimethylolpropane, (hereinafter, the term "poly") is used as the general term of the polyfunctionals including di, tri, tetra, and poly compounds such as mono(meth)acrylate, di(meth)acrylate, and tri(meth)acrylate of trimetylolpropane), and mono(meth) acrylates or poly(meth) acrylates of polyhydric alcohols such as triol, tetraol and hexaol, for example, glycerin, pentaerythritol, ditrimethylolopropane, and dipentaerythritol; (meth)acrylates having hydroxyl groups such s 2-hydroxyethyl(meth)acrylate, 2-hydroxypropyl(meth) acrylate, 4-hydroxybutyl(meth)acrylate, 3-chloro-2-hydroxyethyl(meth)acrylate; (meth)acrylates having bromine atoms such as 2,3-dibromopropyl(meth)acrylate, tribomophenyl(meth)acrylate, etheylene oxide-modified tribomophenyl(meth)acrylate, ethylene oxide-modified tetrabromobisphenol A di(meth)acrylate; (meth)acrylates having fluorine atoms such as trifluoroethyl(meth)acrylate, pentafluoropropyl(meth)acrylate, tetrafluoropropyl(meth) acrylate, octafluoropentyl(meth)acrylate, dodecafluoroheptyl(meth)acrylate, hexadecafluorononyl (meth)acrylate, hexfluorobutyl(meth)acrylate, 3-perflurobutyl-2-hydroxypropyl(meth)acrylate, 3-perflurohexyl-2-hydroxypropyl(meth)acrylate, 3-perfluorooctyl-2-hydroxypropyl(meth)acrylate, 3-(perfluro-5-methylhexyl)-2-hydroxypropyl(meth) acxrylate 3-(perfluro-7-methyloctyl)-2-hydroxypropyl (meth)acrylate, and 3-(perflouro-8-methyldecyl)-2-hydroxypropyl(meth)acrylate.

(Meth)acrylates having aromatic groups which can be used together in the active energy curable composition of the present invention include, for example, but are not limited to, monofunctional (meth)acrylates such as phenyl (meth) acrylate, benzylacrylate; and di (meth)acrylates such as bisphenol A diacrylate, bisphenol F diacrylate, bisphenol S diacrylate.

(Meth)acrylates having alicyclic groups which can be used together in the active energy curable composition of the present invention include, for example, but are not limited to, monofunctional (meth)acrylates having alicyclic structures such as cyclohexyl(meth)acrylate, cyclopentyl(meth) acrylate, cycloheptyl(meth)acrylate, bicycloheptyl(meth) acrylate, isobornyl(meth)acrylate, bicyclopentyidi(meth) acrylate, tricyclodecyl (meth)acrylate, bicyclopentenyl (meth)acrylate, norbornyl(meth)acrylate, bicyclooctyl (meth)acrylate, tricycloheptyl(meth)acrylate, and cholesterol skeleton-substituted (meth)acrylate; di(meth)acrylates of hydrogenated bisphenols such as hydrogenated bisphenol A, hydrogenated bisphenol F, hydrogenated bisphenol S, di(meth)acrylates of hydrogenated trisphenols such as hydrogenated trisphenols and di(meth)acrylates of hydrogenated p, p'-bisphenols; polyfunctional(meth)acrylates having cyclic structures such as dicyclopentane type di(meth) acrylate such as "Kayarad R684" (available from Nihon Kayaku Co., Japan), tricyclodecane dimethyloldi(meth) acrylate, bisphenolfluorene dihydroxy(meth)acrylate; and alicyclic acrylates having oxygen atoms and/or nitrogen atoms such as tetrahydrofurfuryl(meth)acrylate, and morpholinoethyl(meth)acrylate.

As compounds having acryloyl groups or methacryloyl groups which can be used together in the active energy curable composition of the present invention, it is possible to use, beside the above recited compounds, for example, poly(meth)acryl(meth)acrylates such as a reaction product of (meth)acrylic acid polymer and glycidyl (meth)acrylate, and a reaction product of glycidyl(meth)acrylate polymer and (meth)acrylic acid; (meth)acrylate having amino groups such as dimethylaminoethyl(meth)acrylate; isocyanul (meth)acrylates such as tris((meth)acryloxyethyl) isocyanurate; phosphagene(meth)acrylate such as hexakis [(meth) acryloyloxyethyl)cyclotriphosphage n];(meth)acrylate having the skeleton of polysiloxane; polybutadiene(meth) acrylate; and melamine(meth)acrylate. Among these compounds having acryloyl or methacryloyl groups, it is preferable to use the compounds having 1 to 6 acryloyl or methacryloyl groups.

(Meth)acrylamide derivatives, which can be used together in the active energy curable composition of the present invention, include, for example, monofunctional (meth) acrylamides such as N-isopropyl(meth)acrylamide and polyfunctional (meth)acrylamides such as methylenebis(meth) acrylamide.

Compounds having vinyl ether groups which can be used together in the active energy curable composition of the present invention can be classified into, but are not limited to, the following groups, in which: an alkyl vinyl ether having a terminal group substituted with at least one selected from the group consisting of a hydrogen atom, a halogen atom, a hydroxyl group, and an amino group; a cycloalkyl vinyl ether having a terminal group substituted with at least one selected from the group consisting of a hydrogen atom, a halogen atom, a hydroxyl group and an amino group; at least one vinyl ether selected from the group consisting of a monovinyl ether, a divinyl ether, and a polyvinyl ether in which a vinyl ether group is connected with alkylene group; and in which a vinyl ether group is connected with at least one group with and without substituent selected from the group consisting of alkyl group, cycloalkyl group, and aromatic group, via at least one linkage selected from the group consisting of an ether linkage, an urethane linkage, and an ester linkage.

Alkylvinyl ethers which can be used together in the active energy curable composition includes, for example, but are not limited to, methyl vinyl ether, hydroxymethyl vinyl ether, chloromethyl vinyl ether, ethyl vinyl ether, 2-hydroxyethylvinylether, 2-chloroethylvinylether, diethyl aminoethyl vinyl ether, propyl vinyl ether, 3-hydroxypropyl vinyl ether, 2-hydroxpropyl vinyl ether, 3-chloropropyl vinyl ether, 3-aminopropyl vinyl ether, isopropyl vinyl ether, butyl vinyl ether, 4-hydroxybutyl vinyl ether, isobutyl vinyl ether, 4-aminobutyl vinyl ether, pentyl vinyl ether, isopentyl vinyl ether, hexyl vinyl ether, 1,6-hexanediol monovinyl ether, heptyl vinyl ether, 2-ethlhexyl vinyl ether, octyl vinyl ether, isooctyl vinyl ether, nonyl vinyl ether, isononyl vinyl ether, decyl vinyl ether, isodecyl vinyl ether, dodecyl vinyl ether, isododecyl vinyl ether, tridecyl vinyl ether, isotridecyl vinyl ether, pentadecyl vinyl ether, isopentadecyl vinyl ether, hexadecyl vinyl ether, octadecyl vinyl ether, methylene glycol divinyl ether, ethylene glycol divinyl ether, propylene glycol divinyl ether, 1,4-butanediol divinyl ether, 1, 6-hexanediol divinyl ether, cyclohexanediol divinyl ether, trimethylolpropane trivinyl ether, pentaerythritol tetravinyl ether and hexanedioic acid, bis{4-ethenyloxy)butyl} ester.

Cycloalkyl vinyl ethers which can be used together in the active energy curable composition of the present invention includes, for example, but are not limited to, cyclopropyl vinyl ether, 2-hydroxycyclopropyl vinyl ether, 2-chlorocyclopropyl vinyl ether, cyclopropylmethyl vinyl ether, cyclobutyl vinyl ether, 3-hydroxycyclobutyl vinyl ether, 3-chlorocyclobutyl vinyl ether, cyclobutylmethyl vinyl ether, cyclopentyl vinyl ether, 3-hydroxycyclopentyl vinyl ether, 3-chlorocyclopentyl vinyl ether, cyclopentylmethyl vinyl ether, cyclohexyl vinyl ether, 4-hydroxcyclohexyl vinyl ether, cyclohexylmethyl vinyl ether, 4-aminocyclohexyl vinyl ether, cyclohexanediol monovinyl ether, cyclohexanedimethanol monovinyl ether, and cyclohexanedimethanol divinyl ether.

Among compounds which may be used together in the active energy curable composition of the present invention including monovinyl ether, divinyl ethers, and polyvinyl ethers, in which the vinyl ether linkage connects with an alkylene group and at least one group selected from a group consisting of a $C_2$–$C_{24}$ alkyl group, a $C_2$–$C_{24}$ alicyclic group and a $C_2$–$C_{24}$ aromatic group which may have a substituent connects with a linkage selected from a linkage consisting of an ether linkage, an urethane linkage, and an ester linkage, examples of the compounds containing an ether linkage, for example, but are not limited to, ethylene glycol methyl vinyl ether, diethylene glycol monovinyl ether, diethylene glycol methylvinyl ether, diethylene glycol divinyl ether, triethylene glycol monovinyl ether, triethylene glycol methylvinyl ether, triethylene glycol divinyl ether, polyethylene glycol monovinyl ether, polyethylene glycol methylvinyl ether, polyethylene glycol divinyl ether, propylene glycol methylvinyl ether, dipropylene glycol monovinyl ether, dipropylene glycol methylvinyl ether, dipropylene glycol divinyl ether, tripropylene glycol monovinyl ether, tripropylene glycol methylvinyl ether, tripropylene glycol divinyl ether, polypropylene glycol monovinyl ether, polypropylene glycol methylvinyl ether, polypropylene glycol divinyl ether, tetramethylene glycol methylvinyl ether, di(tetramethylene glycol) monovinyl ether, di(tetramethylene glycol) methyl vinyl ether, di(tetramethylene glycol) divinyl ether, tri(tetramethylene glycol) monovinyl ether, tri(tetramethylene glycol) methylvinyl ether, tri(tetramethylene glycol)divinyl ether, poly(tetramethylene glycol)monovinyl ether, poly(tetramethylene glycol) methylvinyl ether, poly(tetramethylene glycol) divinyl ether, 1,6-hexanediolmethyl vinyl ether, di(hexamethylene glycol)monovinyl ether, di(hexamethylene glycol) methylvinyl ether, di(hexamethylene glycol) divinyl ether, tri(hexamethylene glycol) monovinyl ether, tri(hexamethylene glycol) methylvinyl ether, tri(hexamethylene glycol) divinyl ether, poly(hexamethylene glycol) monovinyl ether, poly(hexamethylene glycol) methylvinyl ether, poly(hexamethylene glycol) divinyl ether.

Among compounds classified in the above having vinyl ether linkages, the compounds having urethane linkage may be obtained by the urethanating reaction between a monovinyl ether of (poly)alkylene glycol having at least one hydroxyl group in one molecule and a compound having at least one isocyanate group in one molecule. Among these compounds, the monovinyl ether of (poly)alkylene glycol include at least one hydroxyl group in a molecule, for example, 2-hydroxyethyl vinyl ether, diethylene glycol monovinyl ether, polyethylene glycol monovinyl ether, 3-hydroxpropryl vinyl ether, 2-hydroxy-2-methylethyl vinyl ether, dipropylene glycol monovinyl ether, polypropylene glycol monovinyl ether, 4-hydroxybutyl vinyl ether, and 1,6-hexanediol monovinyl ether.

On the other hand, compounds having at least one isocyanate group in one molecule include, for example, aromatic diisocyanates such as m-isopropenyl-α, α-dimethylbenzylisocyanate, p-phenylenediisocyanate, m-phenylenediisocyanat, p-xylenediisocyanate, m-xylenediisocyanate, 2,4-toluenediisocyanate, 2,6-toluenediisocyanate, 4, 4'diphenylmethanediioscyanate, 3,3'-diethlydiphenyl-4, 4'diisocyanante, 3, 3'-dimethyldiphenyl, 4,4'-diisocyanate, naphthalenediisocyanate; and aliphatic and alicyclic isocyanates such as propylisocyanate, isophoronediisocyanate, hexamethylenediisocyanate, 4, 4' dicylohexylmethanediisocyanate, hydrogenated xylenediisocyanate, norbornenediisocyanate, lysindiisocyanate.

It is also possible to use isocyanate compounds such as dimers or trimers comprising more than one of these isocyanate monomers, and to use adduct compounds obtained by urethanating reactions between isocyanate compounds containing more than 2 isocyanate groups in one molecule and various alcohols.

Various alcohols can be used for obtaining adduct products, if the alcohol contains at least one hydroxyl group. Although there is no limitation, it is preferable to use an alcohol with an average molecular weight of less than 100,000. Examples of such alcohols include, for example, methanol, ethanol, propanol, isopropanol, butanol, isobutanol, ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediiol, 1,10-decanediol, 2,2', 4-trimethyl-1,3-pentanediol, 3-methyl-1,5-pentanediol, dicholoroneopentyl glycol, dibromoneopentyl glycol, neopentylglycol hydroxypivalate, cyclohexanendimethylol, 1,4-cyclohexanediol, spiro glycol, tricyclodecanedimethylol, hydrogenated bisphenol A, ethylene oxide-modified bisphenol A, propylene oxide modified bisphenol A, dimethylol propionic acid, dimethylol butanoic acid, trimethylol ethane, trimethylolpropane, glycerin, 3-methyl-pentane-1,3,5-triol, tris(2-hydroxy thyl) isocyanurate. Polyester-polyols, polyether-polyols, polycarbonate-polyols may be used for obtaining adduct products. These alcohols can be used alone or in combinations of two or more.

Polyester-polyols obtained by reactions of the above polyol components and carboxylic acids may be used in preparing the adduct products. In regards to carboxylic acids, any conventional carboxylic acids or anhydrides thereof may be used. Examples of these carboxylic acids include, for example, maleic acid, fumaric acid, itaconic acid, citraconic acid, tetrahydrophthalic acid, hettic acid, chlorendick acid, dimeric acid, adipic acid, succinic acid, alkenylsuccinic acid, sebacic acid, azelaic acid, 2,2,4-trimethyladipic acid, 1,4-cyclohexanediacarboxylic acid, terephthalic acid, 2-sodiumsulfoterephthalic acid, 2-potassiumsulfoterephthalic acid, isophthalic acid, 5-sodiumsulfoisphthalic acid, 5-potassiumsulfoisophthalic acid; di-lower alkylester of 5-sodium-sulfoisophthalic acid such as dimethyl-or diethylesters of 5-sodium-sulfoisophthalic acid; orthophthalic acid, 4-sulfophthalic acid, 1,10-decamethylenecarboxylic acid, muconic acid, oxalic acid, malonic acid, glutaric acid, trimellitic acid, hexahydrophthalic acid, tetrabromophthalic acid, methylcyclohexenetricarboxylic acid or pyromellitic acid, anhydrides thereof and ester-compounds of these acids with alcohols such as methanol and ethanol. It is also possible to use lactone-polyols obtained by the ring-opening reaction between ε-caprolactam and the above-described polyols.

In regard to polyether polyols, conventional polyether polyols can be used in obtaining adduct products. Examples of such polyether-polyols are, for example, but are not limited to, ether glycols such as polytetramethylene glycol, propylene oxide-modified polytetramethylene glycol, ethylene oxide-modified polytetramethylene glycol, polypropylene glycol, polyethylene glycol, and polyether polyols obtained by ring-opening reactions of cyclic ethers by use of more than three functional polyols as an initiator.

Polycarbonate polyols used in adduct products are obtained by the transesterification reactions of carbonates and various polyols. Examples of carbonates are, for example, but are not limited to, diphenylcarbonate, bischlorophenyl-carbonate, di naphtylcarbonate, phenyl-tolyl-carbonate, phenyl-chlorophenyl-carbonate, and 2-tolyl-4-tolyl-carbonate; diaryl-or dialkyl-carbonates such as dimethylcarbonate and diethylcarbonate. Examples of polyols, which can be used in the above reaction, include the alcohols, polyols, polyester polyols, and polyether polyols described above.

Compounds having ester linkages classified in vinyl ether groups can be obtained by the esterification reaction of monovinyl ether of alkylene glycol having at least one hydroxyl group in a molecule with a compound having at least one carboxyl group in a molecule.

Examples of monovinyl ether of alkylene glycol having at least one hydroxyl group in a molecule are the same compounds as recited as components of the above compounds having urethane bonds.

It is possible to use well-known carboxylic acids and anhydride thereof for the compounds having at least one carboxyl group in a molecule. Examples of the compound having at least one carboxyl group in a molecule include, for example, but are not limited to, formic acid, acetic acid, propionic acid, valeic acid, benzoic acid, maleic acid, fumaric acid, itaconic acid, citraconic acid, tetrahydrophthalic acid, hettic acid, chlorendic acid, dimeric acid, adipic acid, succinic acid, alkenylsuccinic acid, sebacic acid, azelaic acid, 2,2' 4-trimethyladipic acid, 1,4-cyclohexanedicarboxyl acid, terephthalic acid, 2-sodiumsulfoterephthalic acid, 2-potassiumsulfoterephthalic acid, isophthalic acid, 5-sodium-sulfoisophthalic acid, 5-potassiumsulfoisophthalic acid, di-lower-alkylesters of 5-sodium-sulfoisophthalic acid such as dimethyl-or diethyl-esters of 5-sodium-sulfoisophthalic acid, orthophthalic acid, 4-sulfophtalic acid, 1,10-decamethylenedicaboxylic acid, muconic acid, oxalic acid, malonic acid, glutaric acid, trimellitic acid, hexahydrophthalic acid, tetrabromophthalic acid, methylcyclohexenetricarboxylic acid or pyromellitic acid, and anhydrides of these compounds. In addition, carboxyl acids obtained by reactions between compounds having more than two carboxylic groups and various alcohols, which are used as component among compounds having urethane linkages, and which is used in obtaining adduct products of isocyanate.

Vinyl carboxylate derivates, which can be, used together in the active energy curable compositions include, for example, vinyl acetate and vinyl cinnamate. Styrene derivatives include, for example, styrene and divinyistyrene.

Unsaturated polyester which can be used together in the active energy curable composition include, for example, maleates such as dimethylmaleate and diethylmaleate; fumarates such as dimethylfumarate and diethylfumarate; and esterification products of unsaturated polycarboxylic acids such as maleic acid and fumaric acid and polyhydric alcohols.

Unlimited combinations of one or more of any compounds can be used, without being limited to the compounds described herein before and those represented by general Formula (1) as curable compounds which can be used together in the active energy curable composition of the present invention. However, the compounds must copolymerizable with the maleimide derivates described herein.

The phrase "water compatible" is used herein to describe compounds that are partially or substantially water dilutable, water soluble and/or capable of forming a water emulsion or dispersion with the energy curable composition herein.

However, in the case where the energy curable compositions are used to formulate coatings, it is preferred that the particular water compatible compound be compatible with both the water and maleimide derivates in order to avoid any phase separation or precipitation of one or more of the components. While not wishing to be bound by theory, the water compatible resin compounds used for coating applications work best if they possess functional groups which are compatible with water on one hand and functional groups which are compatible with the maleimide derivatives on the other.

Although there is no particular limitation in the ratio of maleimide derivatives represented by Formula (1) to those maleimide derivatives when both maleimide derivatives are used together are used together in the active energy curable composition containing maleimide derivates, it is preferable to select the ratio of maleimide derivatives other than these represented by Formula (1) equal or less than 95% by weight and more preferably equal or less than 90% by weight.

Although there is no limitation in the ratio of a compound having acryloyloxy or methacryloyloxy groups to the maleimide derivatives represented by Formula (1), when used in the active energy curable composition of the present invention containing maleimide derivates, it is preferable to use the compound having acryloyloxy or methacryloyloxy groups such that 100 parts by weight of the compounds having acryloyloxy or methacryloyloxy groups constitutes a ratio of equal or more than 5 parts by weight of maleimide derivatives represented by formula (1), and, more preferably, the ratio of equal or more than 20 parts by weight from the point of view of the curing speed.

When a compound having vinyl ether groups is used together in the active energy curable composition containing maleimide derivatives of the present invention, there is no limitation on the ratio to be incorporated in the composition. However, it is preferable to use the compound having vinyl ether groups such that 100 parts by weight of the compound having vinyl ether groups constitutes a ratio of equal or more than 5 parts by weight of maleimide derivatives represented by Formula (1), and the use of equimolar amount of a vinyl ether group to a maleimide group is more preferable from points of view of the curing speed and a cured film property.

The active energy curable compositions of the present invention have intrinsic spectral sensitivity ranging from 200 to 400 nm, and it is possible to polymerize same under an irradiation of ultraviolet or visible light within a range of 180 to 500 nm, even without use of a photoinitiator. It was observed that lights having wavelengths at 254 nm, 308 nm, 313 nm, and 365 nm are effective in curing of the active energy curable composition of the present invention. It is also possible to cure or polymerize the present active energy curable composition by light other than the ultraviolet light and by heat. In addition, it is possible to cure the present active energy curable composition in air and/or an inert gas. Various energy cure sources such as thermal, ultraviolet light, infrared and visible light may be used, for example, a low-pressure-mercury lamp, a high-pressure-mercury lamp, an ultrahigh pressure-mercury lamp, a metal halide lamp, a chemical lamp, a black-light lamp, a mercury xenon lamp, an excimer lamp, a short-arc lamp, a helium-cadmium laser, an argon laser, an excimer laser and sunlight.

Although the active energy curable compositions of the present invention can be cured under irradiation of ultraviolet light or visible light, in the absence of a photoinitiator, conventional photoinitiators may nonetheless be used for polymerization. The photoinitiators may be classified into two groups; one is an intramolecular-bond-cleavage type and the other is an intramolecular-hydrogen-abstraction type.

Examples of the intramolecular-bond-cleavage type photoinitiators include, for example, acetophenones such as diethoxyacetophenone, 2-hydroxy-2-methyl-1-phenylpropane-1-one, benzyldimethylketal, 1-(4-isopropylphenyl)-2-hydroxy-2-methylpropan-1-one, 4-(2-hydroxylethoxy)phenyl-(2-hydroxy-2-methylpropyl) ketone, 4-(2-hydroxyethoxy)phenyl-2-hydroxy-2-propyl) ketone, 1-hydroxycyclohexyl-phenylketone, 2-methyl-2-morpholino(4-thiomethylphenyl)propan-1-one, and 2-benzyl-2-dimethylamino-1-(4-morpholinophenyl)-butanone; benzoins such as benzoin, benzoinmethyl ether, benzoinisopropyl ether; acylphosphine oxides such as 2,4,6-trimethylbenzoindiphenylphosphine oxides; benzyl and methylphenyl-glyoxyester.

Examples of intramolecular-hydrogen abstraction type photoinitiators include, for example, benzophenones such as benzophenone methyl-4-phenylbenzophenone o-benzoylbenzoate, 4, 4'dichlorobenzophenone, hydroxybenzophenone, 4-benzoyl-4'-methyl-diphenysulfide, acrylic-benzophenone, 3,3',4,4'-tetra(t-butylperoxycarbonyl)benzophenone, 3,3'-dimethyl-4-methoxybenzophenone; thioxanthones such as 2-isopropyl-thioxanthone, 2,4-dimethylthioxanthone, 2,4-diethyl-thioxanthone, 2,4-dichlorothioxanthone; aminobenzophenones such as Michler's ketone, 4, 4'-diethylaminobenzophenone; 10-butyl-2-chloroacridone, 2-ethylanthraquinone, 9, 10 phenanthrenequinone and camphorquinone.

It is preferable to add the photoinitiator to the active energy curable composition within a range of 0.01 to 10.00% by weight.

Although the active energy compositions of the present invention can be cured by irradiation of ultraviolet, it is also possible to use a sensitizer for efficient curing.

Examples of such sensitizer are, for example, amines such as triethanolamine, methyldiethanolamine, triisopropanolamine, methyl 4-dimethylaminobenzoate, ethyl 4-dimethyl-aminobenzoate, isoamyl 4-dimethylaminobenzoate, (2-dimethyl-amino)ethyl benzoate, (n-butyoxy) ethyl 4-dimethylaminobenzoate, and 2-ethylhexyl 4-dimethylaminobenzoate. It is preferable to add the sensitizer to the active energy curable composition within a range of 0.01 to 10.00% by weight.

It is possible to further use together, if necessary additives such as non-reactive compounds, inorganic fillers, organic fillers, coupling reagents, adhesive reagents, antifoaming reagent, leveling reagents, plasticizers, antioxidants, ultraviolet-absorbers, flame retardants, pigments, dyes and paints.

Examples of the non-reactive compounds which are usable together in the active energy curable composition include, for example, but are not limited to, liquid or solid ligomers or resins with a low reactivity or non-reactivities such as, alkyl (meth)acrylate copolymer, epoxy resins, liquid polybutadiene, liquid polybutadiene derivatives, liquid chloroprene, liquid polypentadiene, dichloropentadiene derivative, saturated polyester oligomer, polyether oligomer, acrylic oligomer, liquid polyamide, polyisocyanate oligomer, xylene resin, acrylic resin, ketone resin, petroleum resin, rosin resin, fluorinate-type oligomer, silicone type oligomer polysulfide oligomers.

Inorganic and organic fillers are generally used for improving mechanical properties such as strength, cushioning and slipping properties.

Any conventional fillers may be used if the fillers are compatible with the water containing composition and do not harm the characteristics of the resin including curing. Inorganic fillers which maybe use used include, for example but are not limited to, silicone dioxide silicon oxide, calcium, carbonate, calcium silicate, magnesium carbonate, magnesium oxide, talc, kaoline clay, calcined clay, zinc oxide, zinc sulfate, aluminum hydroxide, aluminum oxide, glass, mica, barium sulfate, alumina white, zeolite, silica spherules, and glass spherules. It is possible to add halogen groups, epoxy groups, hydroxyl groups and thiol groups to these fillers by addition or by the reaction with various coupling reagents such as a silane coupling reagent, a titanate-type coupling reagent, an aluminum-type coupling reagent, a zirconate-type couple reagent, and the like.

Conventional organic fillers which may be used include for example, but are not limited to, a benzoguanamine resin, a silicone resin, a low-density polyethylene, a high-density polyethylene, a polyolefin resin, ethylene-acrylate copolymer, polystyrene, cross linking polystyrene, polydivinylbenzene, styrene-divinylbenzene copolymer, acrylic copolymer, cross-linking acrylic resin, polymethyl-methacrylate resin, vinylidene-chloride resin, fluororesin, nylon 12, nylon 11, nylon 6/66, phenolic resin, epoxy resin, urethane resin, and polyimide resin. It is possible to add halogen groups, epoxy groups, hydroxyl groups and thiol group to these organic fillers.

Example of coupling reagents which can be used together in the active energy curable composition of the present invention include, for example, but are not limited to, silane coupling reagents such γ-glycidoxypropyltrimethoxysilane, and γ-chloropropyltrimethoxysilane, titanate coupling reagents such as tetra (2,2-diarloxymethyl-1-butyl) bis (ditridecyl) phosphitetitanate, and bis(dioctylpyrophophate) ethylenetitanate; aluminum coupling reagents such as acetoalkoxyaluminumdiiosopropylate, zirconium coupling agents such as acethylacetone-zirconium complex and the like.

Regarding additives such adhesive reagents, antifoaming reagents, leveling reagents, flow reagents, plasticizers, antioxidants, ultraviolet-absorbers, flame retardants, pigments, dyes, and paints, any corresponding conventional additives may be used together, without any limitation, in the active energy curable composition of the present invention, if the additives are compatible with the water containing composition and do not harm the characteristics of the resin including the curing property.

In order to obtain the active energy curable composition of the present invention, the aforementioned components may be mixed, the mixing order or mixing method are not limited.

It is substantially not necessary to use a solvent in the active energy curable composition of the present invention.

However, for diluting the active energy curable composition of the present invention, it may possible to use conventional and generally known solvents including ketones such as methylethylketone and methylisobutylketone; acetates such as ethyl acetate and butyl acetate, aromatic hydrocarbons such as benzene, toluene and xylene; and alcohols such as methanol, ethanol, isopropyl alcohol, butanol and water.

The active energy curable composition of the present invention is advantageously applicable for surface finishing, binders, plastic materials, molding materials, laminate plates, adhesives, bonding materials, and ink; coating materials for metals such as aluminum, iron and copper; coating materials for plastics such as vinyl chloride, acryls, polycarbonate, polyethyleneterephthalate, and acrylonitrilebutadienestyrene copolymer, polyethylene, and polypropylene; coating materials for ceramics such as glass; coating materials for other material such as wood, paper, printing paper and fibers.

The active energy curable composition of the present invention forms a cured film without a photoinitiator under irradiation of light. Since this active energy curable composition of the present invention does not general odor during curing and the cured film of this composition does not incur yellowing and odor, and an amount of elution from this cured film is quite low, the present composition can be advantageously applied to a field of inks such as lithographic ink, flexo-ink, gravure ink and screen ink and to fields of gloss varnish, paper coating wood painting, beverage can coating, printing, soft package coating, adhesives for printed papers and laminates, lavel coating, printing ink or adhesives, thermosensible paper, printing ink or coating for thermosensible paper, food package coating, printing ink, adhesives and binders, which are directly contacted with a consumer.

The following examples illustrates specific aspects of the present invention and are not intended to limit the scope thereof in any respect and should not be so construed. In the examples, all parts are by weight unless otherwise indicated. The relationship of parts by weight to parts by volume is as that of kilograms to liters.

In the examples, the energy curable compositions were coated on opacity charts (uncoated Leneta N2A, available from Leneta Corporation, Mahwah, N.J.) using a #3 Mayer rod having a thickness of 7.5 microns. The ultraviolet radiation energy cure source was provided using a conveyor type unit with a medium pressure mercury lamp of variable light intensities (e.g. 120, 200, 300 watts per inch (wpi) available from Fusion Aetek, Rockville Md.) at conveyor speeds varying from 100 to 200 feet per minute (fpm). At 200 wpi and 100 fpm the ultraviolet exposure dose was 228 mJ/cm$^2$, measured using a radiometer (UV Power Puck, Power Puck is a Registered Trademark of EIT Incorporated, VA). This dose is normally sufficient to produce a commercially viable film. The surface harness of the coating was empirically measured by scratching the surface with a human nail. The reflective gloss of the cured film was measured at 60° using a glossmeter (Micro-Gloss 60, available from BYK-Gardner Incorporated, MD). The solvent resistance of the cured film was measured by the surface with a cotton tipped applicator soaked in methyl ethyl ketone (MEK), isopropyl alcohol or water until the substrate was exposed. The number of rubs, i.e. one stroke back and forth across a surface, were recorded. A coating exhibiting 10 rub MEK resistance, for example, was considered to be commercially feasible.

EXAMPLE 1

Synthesis Example

Glycine (37.5 g) and acetic acid (400 ml) were admixed then a solution of maleic anhydride (49.0 g) and acetic acid (300 ml) was added dropwise over 2 hours under stirring. The reaction was continued for 1 hour and the precipitate that formed was filtered off and recrystallized from a 70% aqueous methanol solution. To this product (102 g), triethylamine (40.4 g), and toluene (500 ml) were added and the mixture was reacted for 1 hour while stirring under reflux to remove the evolved water. The residue, obtained by removing toluene from the reaction mixture, was acidified to a pH of 2 with 0.1 N HCl, extracted 3 times with ethyl acetate (100 ml) and dried with magnesium sulfate. The ethyl acetate was then evaporated under pressure and the residue was recrystallized from water, whereby pale yellow crystals of maleimidoacetic acid (11 g) were obtained. $^1$H NMR (300 MHz, DMSO-d6): 7.0 ppm (s, 2H, —C=C—); 4.1 ppm (s, 2H, —CH2—); IR: 3170 cm$^{-1}$ (—COOH); 1750 cm$^{-1}$; 1719 cm$^{-1}$ (C=O); 831 cm$^{-1}$; 696 cm$^{-1}$ (—C=C—); Elemental analysis (CHN): Calcd. C:46.5%; H:3.87%; N:9.03%; Found C:46.2%; H:4.05%; and N:8.70%.

Maleimidoacetic acid (6.8 g), polytetramethylene glycol (10 g, MW of 250, tradename PolyTHF 250, available from BASF Corporation, Japan), p-toluenesulfonic acid (1.2 g), 2,6-tert-butyl-p-cresol (0.06 g), and toluene (15 ml) were added together and reacted at 80° C. for 4 hours under reduced pressure (240 torr). The mixture was stirred and the water formed during the reaction was removed. The reaction mixture was then dissolved in toluene (200 ml) and washed 3 times with a saturated sodium hydrogen carbonate aqueous solution (100 ml) and a saturated sodium chloride aqueous solution (100 ml). The toluene was then removed under reduced pressure and a maleimide derivative (16 g) having the structure below was obtained.

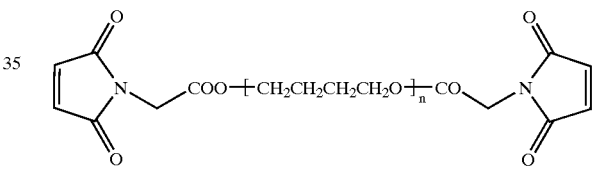

EXAMPLE 2

Synthesis Examples

Glycine (37.5 g) and acetic acid (400 ml) were admixed then a solution of maleic anhydride (49.0 g) and acetic acid (300 ml) was added dropwise over 2 hours under stirring. The reaction was continued for 1 hour and the precipitate that formed was filtered off and recrystallized from a 70% aqueous methanol solution. To this product (102 g), triethylamine (40.4 g), and toluene (500 ml) were added and the mixture was reacted for 1 house while stirring under reflux to remove the evolved water. The residue, obtained by removing toluene from the reaction mixture, was acidified to a pH of 2 with 0.1 N HCl, extracted 3 times with ethyl acetate (100 ml) and dried with magnesium sulfate. The ethyl acetate was then evaporated under reduced pressure and the residue was recrystallized from water, whereby pale yellow crystals of maleimidoacetic acid (11 g) were obtained. $^1$H NMR (300 MHz, DMSO-d6): 7.0 ppm (s, 2H, —C=C—); 4.1 ppm (s, 2H, —CH2—) IR: 3170 cm-1 (—COOH); 1750 cm$^{-1}$; 1719 cm$^{-1}$ (C=O) 831 cm$^{-1}$; 696 cm$^{-1}$ (—C=C—); Elemental analysis (CHN): Calcd. C:46.5%; H:3.87%; N:9.03%; Found C:46.2%; H:4.05%; and N:8.70%.

Maleimidoacetic acid (6.8 g) pentaerythritol modified by 4 moles of ethylene oxide (4.1 trade name PNT-40 Mn:490, Mw:530, available from Nippon Emulsifying Agent Co., Ltd., Japan), p-toluenesulfonic acid (1.2 g), 2,6-tert-butyl-pcresol (0.06 g), and toluene (15 ml) were added together and reacted at 80° C. for 4 hours under reduced pressure (240 15 torr). The mixture was stirred and the water formed during the reaction was removed. The reaction mixture was then dissolved in toluene (200 ml) and washed 3 times with a saturated sodium hydrogen carbonate aqueous solution (100 ml) and a saturated sodium chloride aqueous solution (100 ml).

The toluene was then removed under reduced pressure and a maleimide derivative (18 g) having the structure below was obtained

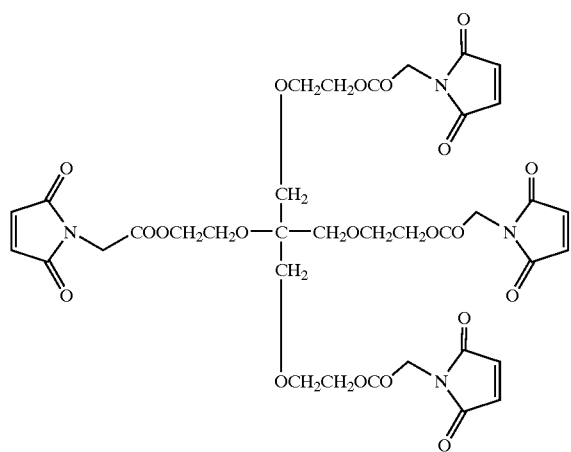

EXAMPLE 3

An aliphatic epoxy acrylate resin (55 wt. %, Laromer 8765, available from BASF, Mt. Olive, N.J.) was combined with water (8.5 wt. %). Next, a maleimide as prepared in Example 1 (36 wt. %) was added. A polyether siloxane additive (0.5 wt. %, Glide 440, available from Tego Chemie, VA) was then added to produce sufficient flow properties. The curing, solvent resistance, gloss and surface hardness properties of the coating as described above were then evaluated. The results are shown in Table 1.

EXAMPLE 4

Comparative

The maleimide prepared in Example 1 (84.5 wt. %) was added to water (15 wt. %). A polyether siloxane additive (0.5 wt. %, Glide 440, available from Tego Chemie, VA) was then added to produce sufficient flow properties. The energy curing properties of the coating could not be evaluated because the water and maleimide were found to be incompatible and no film was produced.

EXAMPLE 5

An aliphatic epoxy acrylate resin (58 wt. %, Laromer 8765, available from BASF, Mt. Olive, N.J.) was combined with water (13.6 wt. %). Next, a photoinitiator, 4-(2hydroxylethoxy) phenyl-(2-Hydroxy-2-methylpropyl) ketone was added (3 wt. %, Irgacure 2959, available from Ciba-Geigy, NY). A polysiloxane additive (0.4 wt. %, DC57, available from Dow Chemical, Midland, Mich.) was then added to produce sufficient flow properties. Finally, the maleimide prepared in Example 1 (25 wt. %) was then added. The curing, solvent resistance, gloss and surface hardness properties of the coating described above were then evaluated. The results are shown in Table 1.

EXAMPLE 6

An aliphatic epoxy acrylate resin (50 wt. %, Laromer 8765, available from BASF, Mt. Olive, N.J.) was combined with water (17 wt. %). The maleimide prepared in Example 1 (17 wt. %, MIA250) was then added along with isopropyl alcohol (15.5 wt. %). A polyether siloxane additive (0.5 wt. %, Glide 440, available from Tego Chemie, VA) was then added to produce sufficient flow properties. The composition was irradiated at three different doses. The curing, solvent resistance, gloss and surface hardness properties of the coating for each dose as described above were then evaluated. The results are shown in Table 1.

EXAMPLE 7

A water dilutable aliphatic urethane acrylic resin (25 wt. %, Ebecryl 2001, available from UCB Radcure, GA) was combined with water (49.5 wt. %). The maleimide prepared in Example 1 (25 wt. %, MIA 250) was added along with a polyether siloxane additive (0.5 wt. %, Glide 440 available from Tego Chemie, VA) to produce sufficient flow properties. The composition was irradiated at two different doses. The curing, solvent resistance, gloss and surface hardness properties of the coating described above were then evaluated. The results are shown in Table 1.

EXAMPLE 8

A highly alkoxylated trimethylolpropane triacycrylate resin (61 wt. %, SR 9035, available from Sartomer, PA) was combined with water (24 wt. %). The maleimide prepared in Example 1 (14.5 wt. %) was added. A polyether siloxane additive (0.5 wt. %, Glide 440, available from Tego Chemie, VA) was then added to produce sufficient flow properties. The composition was irradiated at two different doses. The curing, solvent resistance, gloss and surface hardness properties of the coating described above were then evaluated. The results are shown in Table 1.

EXAMPLE 9

An aliphatic epoxy acrylate resin (57 wt. %, Laromer 8765, available from BASF, Mt. Olive, N.J.) was combined with water (10.5 wt. %). A vinyl ether, hexanedioic acid, bis(4-ethenyloxy)butylester (10.5 wt. %, VEX 4060, available from Allied Signal, NJ) was then added. A maleimide as prepared in Example 1 (21.5 wt. %) was then added along with a polysiloxane additive (0.5 wt. %, DC57, available from Dow Chemical, Midland, Mich.) to produce sufficient flow properties.

The composition was irradiated at two different doses. The curing, solvent resistance, gloss and surface hardness properties of the coating described above were then evaluated. The results are shown in Table 1.

EXAMPLE 10

Comparative

A vinyl ether, hexanedioic acid, bis(4-ethenyloxy) butyl) ester (67 wt. %, VEX 4060, available from Allied Signal, NJ) was added to water (11 wt. %). The maleimide prepared in Example 1 (21.5 wt. %), was added along with a polyether siloxane additive (0.5 wt. %, DC57, available from Dow Chemical, Midland, Mich.) to produce sufficient flow properties. The energy curing properties of the coating could not be evaluated because the water and maleimide were found to be incompatible and no film was formed.

EXAMPLE 11

An aliphatic epoxy acrylate resin (72 wt. %, Laromer 8765, available from BASF, Mt. Olive, N.J.) was combined with water (16 wt. %). The maleimide prepared in Example 2 (11.2 wt. %, MIA-PE4EO) was then added. A polyether siloxane additive (0.8 wt. %, Glide 440, available from Tego Chemie, VA) was then added to produce sufficient flow properties. The curing, solvent resistance, gloss and surface hardness properties of the coating described above were then evaluated. The results are shown in Table 1.

EXAMPLE 12

Comparative

A maleimide prepared in Example 2 (84.5 wt. %, MIA-PE4EO) was added to water (15 wt. %). A polyether siloxane additive (0.5 wt. %, Glide 440, available from Tego Chemie, VA) was then added to produce sufficient flow properties. The energy curing properties of the coating could not be evaluated because the water and maleimide were found to be incompatible and no film was produced.

TABLE 1

| Example | Cure Rate (mJ/cm$^2$) | Surface Hardness | 60° Gloss (%) | Solvent Rubs (MEK) | Solvent Rubs (Water) |
|---|---|---|---|---|---|
| 3 | 228 | Excellent | 85–90 | 65 | >200 |
| 5 | 228 | Excellent | 92 | 40–44 | >200 |
| 6 | 125 | Very good | 85–88 | 8 | 50 |
| 6 | 209 | Very good | 88–90 | 12–15 | 70 |
| 6 | 254 | Excellent | 88–90 | 38 | >200 |
| 7 | 228 | Good | 80–82 | 45 | N.A. |
| 7 | 607 | Very good | 80–82 | 75 | N.A. |
| 8 | 204 | Fair | 65–70 | 3 | 8 |
| 8 | 305 | Good | 65–70 | 5 | 19 |
| 9 | 228 | Very good | 86–87 | 9 | 31 |
| 9 | 456 | Excellent | 87–88 | 31 | 66 |
| 11 | 228 | Fair | 86 | 26 | 80 |

The data in Table 1 shows several characteristics of the water compatible energy curable compositions of the present invention. The dose required to cure the composition was similar to that used to cure conventional energy curable materials. The surface hardness and gloss of the cured films were comparable to commercial coatings using photoinitiators. The solvent rubs of the cured compositions were typical of the results that would be achieved with a similar composition containing commercial photoinitiators and resins. This is by exemplified by Example 3 wherein the cure rate doses of 228 mJ/cm$^2$ represents a conveyor speed of 100 fpm and 200 wpi lamp intensity, represent a commercially practical amount of energy delivered to cure the composition. Examples 3 and 7 depict gloss values greater than 80, which are indicative of a high commercial grade gloss. Example 3 depicts solvent rubs of 65 with MEK and greater than 200 with water. These values are typically higher than those shown for conventional commercial coatings cured under similar conditions. Example 6 shows that by doubling the curing dose, from 125 to 254 mJ/cm$^2$, for the energy curable compositions of the present invention, one can improve its film properties, such as surface hardness, gloss and crosslink density as measured by solvent resistance and illustrated by an increase in MEK solvent rubs from 8 to 38.

Example 9 shows a similar increase in solvent rubs, from 9 to 31 MEK rubs and 31 to 66 water rubs. Although a higher cure rate dose was required, it was still within the range for commercial curing.

The present invention has been described in detail, including the preferred embodiments thereof. However, it will be appreciated that those skilled in the art may make numerous variations or modifications of the embodiments that fall within the scope and spirit of the invention as set forth in the following claims.

What is claimed:

1. A method for curing an active single phase water compatible actinic radiation curable composition, comprising: irradiating a water compatible non emulsion, non dispersing compound, water, and a maleimide derivative of the formula:

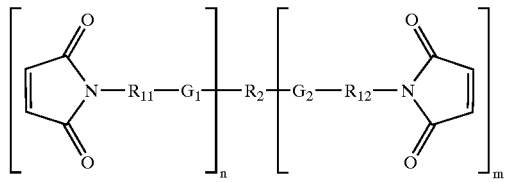

wherein n and m each independently represent an integer of 1 to 5, and the total of m and n is 6 or smaller;

$R_{11}$ and $R_{12}$ each independently represent a linking group selected from the group consisting of an alkylene group, an alicyclic group, an arylalkylene group, and a cycloalkylalkyene group;

$G_1$ and $G_2$ each represent an ester linkage selected from the group consisting of —COO— and —OCO—;

and $R_2$ represents a linking chain having an average molecular weight of 100 to 100,000 selected from the group consisting of (poly)ether (poly)ester linking chains, or mixtures thereof in which at least one organic group selected from straight or branched chain alkylene group, straight or branched chain alkylene group having a hydroxyl group, alicyclic group, aryl group, arylalkylene group, and a cycloalkylalkyene group connected via at least one linkage selected from the group consisting of an ether or ester linkage.

2. The method according to claim 1 wherein said water compatible compound is selected from the group consisting of acrylate resins; methacrylate resins; acrylic dispersions; urethane resins; vinyl alcohols such as ethylene vinyl alcohol and ethylene vinyl alcohol; vinyl alcohol copolymers such as ethylene vinyl alcohol copolymer; polysaccharides; polysucrose; and glucose.

3. The method according to claim 1 wherein the need to dry the actinic radiation curable composition prior to irradiation is eliminated.

4. The method according to claim 1 wherein the need to dry the actinic radiation curable composition after irradiation is eliminated.

5. The method according to claim 1 wherein $R_2$ of the maleimide derivative is a (poly)ether or (poly)ester linking chain, having a molecular weight of greater than 200.

6. The method according to claim 2 further comprising adding a compound copolymerizable with the said maleimide derivative and water compatible compound.

* * * * *